United States Patent
Endo

(10) Patent No.: US 12,158,451 B2
(45) Date of Patent: Dec. 3, 2024

(54) REPEATED MOMENT GENERATION DEVICE

(71) Applicant: Fukuoka University, Fukuoka (JP)

(72) Inventor: Masahiro Endo, Fukuoka (JP)

(73) Assignee: Fukuoka University, Fukuoka (JP)

( * ) Notice: Subject to any disclaimer, the term of this patent is extended or adjusted under 35 U.S.C. 154(b) by 287 days.

(21) Appl. No.: 17/961,773

(22) Filed: Oct. 7, 2022

(65) Prior Publication Data

US 2023/0035932 A1    Feb. 2, 2023

Related U.S. Application Data

(63) Continuation of application No. PCT/JP2021/014813, filed on Apr. 7, 2021.

(30) Foreign Application Priority Data

Apr. 8, 2020   (JP) .................................. 2020-069940

(51) Int. Cl.
    *G01N 3/16*    (2006.01)
    *G01N 3/22*    (2006.01)
    (Continued)

(52) U.S. Cl.
    CPC ............... *G01N 3/165* (2013.01); *G01N 3/22* (2013.01); *G01N 3/32* (2013.01); *G01N 3/56* (2013.01)

(58) Field of Classification Search
    CPC ............ G01N 3/165; G01N 3/22; G01N 3/32; G01N 2203/0021; G01N 2203/0037
    See application file for complete search history.

(56) References Cited

U.S. PATENT DOCUMENTS 7,213,479 B2 *  5/2007  Mitsui .................... E02D 3/026
                                                    74/61
2009/0139344 A1   6/2009  Lindeman

FOREIGN PATENT DOCUMENTS

CN      201926593 U    8/2011
JP      S52-32264 B1   8/1977
              (Continued)

OTHER PUBLICATIONS

Ito et al. (JP 01-176481 A), Vibromotive Machine for Structure Testing, Jul. 1989, eSpacenet Machine Translation (Year: 1989).*
(Continued)

*Primary Examiner* — Erika J. Villaluna
(74) *Attorney, Agent, or Firm* — Nakanishi IP Associates, LLC

(57) ABSTRACT

Provided is a repeated moment generation device that includes: a principal shaft; principal bearing members; lever members; principal eccentric weight rotors; auxiliary eccentric weight rotors; and drive means (such as a motor) for causing the principal eccentric weight rotors and the auxiliary eccentric weight rotors to synchronously rotate. Eccentricity directions of the principal eccentric weight rotors are different from each other by 180 degrees around shaft centers of shaft bodies thereof, eccentricity directions of the auxiliary eccentric weight rotors are different from each other by 180 degrees around shaft centers of shaft bodies thereof, and the eccentricity direction of the principal eccentric weight rotor and the eccentricity direction of the auxiliary weight rotor located on the same side as the principal eccentric weight rotor with respect to the principal shaft 1 are different from each other by 180 degrees around the shaft centers of the shaft bodies thereof.

4 Claims, 21 Drawing Sheets

(51) Int. Cl.
*G01N 3/32* (2006.01)
*G01N 3/56* (2006.01)

(56) References Cited

FOREIGN PATENT DOCUMENTS

| | | | |
|---|---|---|---|
| JP | S55-46244 U1 | | 3/1980 |
| JP | S56-59642 U1 | | 5/1981 |
| JP | S57-199084 U1 | | 12/1982 |
| JP | S58-163855 U1 | | 10/1983 |
| JP | S61-105843 U1 | | 7/1986 |
| JP | 01176481 A | * | 7/1987 |
| JP | 03013621 A | * | 1/1991 |
| JP | H06-337233 A | | 12/1994 |
| JP | 2007-057429 A | | 3/2007 |
| JP | 2011-64508 A | | 3/2011 |
| WO | 2009/073091 A1 | | 6/2009 |

OTHER PUBLICATIONS

International Search Report issued in PCT/JP2021/014813 dated on Jun. 22, 2021 with English Translation (7 pages).
International Preliminary Report on Patentability issued in PCT/JP2021/014813 dated on Oct. 6, 2022, with English Translation (9 pages).
Office Action issued in Indian Patent Application No. 202217062784 dated Mar. 21, 2023 (6 pages).

* cited by examiner

REPEATED MOMENT GENERATION DEVICE

TECHNICAL FIELD

The present invention relates to a repeated moment generation device that can be used as means for loading a repeated moment on a test piece in a fatigue testing machine adapted to load a repeated moment on a test piece to test a fatigue strength property of a material.

BACKGROUND ART

The present inventors have proposed in Patent Literature 1 that "it is possible to employ a mechanism or a link mechanism as a combination of an eccentric cam driven to rotate by an inverter motor and a beam member, for example" as repeated moment generation means in a conventional torsional fatigue testing machine.

On the other hand, there are a "vibration fatigue testing machine" described in Patent Literature 2 and a "fatigue testing machine" described in Patent Literature 3, for example, as related arts in association with the present invention, although they are different from a torsional fatigue testing machine.

The "vibration fatigue testing machine" described in Patent Literature 2 includes "a mechanism that generates vibration by a motor rotating an unbalanced pendulum and imparting a load on a sample attached to a sample holder". Also, the "fatigue testing machine" described in Cited Document 3 has a function of "transmitting vibration generated in a direction orthogonal to a rotation shaft core to a specimen and imparting a repeated load on the test piece while an eccentric weight is caused to rotate about the rotation shaft core".

CITATION LIST

Patent Literature

Patent Literature 1
  Japanese Patent Laid-Open No. 2011-64508
Patent Literature 2
  Japanese Patent Laid-Open No. 6-337233
Patent Literature 3
  Japanese Utility Model Laid-Open No. 58-163855

SUMMARY OF INVENTION

Technical Problem

The conventional fatigue testing machines described in Patent Literatures 1 to 3 and the like employ, as means for repeatedly imparting a torsional load or an axial load on test pieces, mechanisms that generate a repeated moment or axial vibration in shaft bodies by causing eccentric weights to rotate with members connected to the test pieces. However, since forces in up-down and left-right directions repeatedly act on the fatigue testing machines during testing due to centrifugal forces generated through rotation of the eccentric weights, relatively large vibration and noise are generated.

Therefore, in a case of a general-purpose fatigue testing machine with moment capacity of about 50 Nm, for example, it is necessary to fix the fatigue testing machine on a heavy platform (for example, a concrete block) in order to forcibly curb vibration, and as a result, the fatigue testing machine that is actually used is a one-ton class large-scaled heavy product in the actual situation.

Thus, a problem to be solved by the present invention is to provide a repeated moment generation device capable of realizing size reduction, weight reduction, and noise reduction for a fatigue testing machine.

Solution to Problem

A repeated moment generation device according to the present invention includes: a principal shaft that is for transmitting a repeated torsional moment; two principal bearing members that rotatably hold the principal shaft; two lever members that are attached to the principal shaft at positions separated in a shaft center direction of the principal shaft in a state in which each of the lever members perpendicularly intersects a shaft center of the principal shaft; principal eccentric weight rotors that are provided at shaft bodies that are rotatably and axially supported by the lever members in a state in which each of the principal eccentric weight rotors is parallel to the principal shaft, at symmetrical positions with the principal shaft interposed therebetween in a region where the lever members face each other; auxiliary eccentric weight rotors that are provided such that each of the auxiliary eccentric weight rotors is rotatable about a shaft body that is parallel to the principal shaft, between two pairs of auxiliary bearing members provided at members that are continued from the principal bearing members; and drive means for causing the two principal eccentric weight rotors and the two auxiliary eccentric weight rotors to synchronously rotate, in which eccentricity directions of centers of gravity of the two principal eccentric weight rotors are different from each other by 180 degrees around shaft centers thereof, eccentricity directions of centers of gravity of the two auxiliary eccentric weight rotors are different from each other by 180 degrees around shaft centers thereof, and the eccentricity direction of the center of gravity of one of the principal eccentric weight rotors and the eccentricity direction of the center of gravity of the auxiliary eccentric weight rotor located on the same side as the principal eccentric weight rotor with respect to the principal shaft are different from each other by 180 degrees around the shaft centers thereof.

In the repeated moment generation device, it is preferable that two centrifugal forces generated through rotation of the two principal eccentric weight rotors have mutually the same magnitude and have acting directions that are opposite by 180 degrees, and that two centrifugal forces generated through rotation of the two auxiliary eccentric weight rotors have mutually the same magnitude and have acting directions that are opposite by 180 degrees.

In the repeated moment generation device, it is preferable that a couple of forces defined by a product of two centrifugal forces generated through rotation of the two principal eccentric weight rotors and a distance between lines of action of the two centrifugal forces and a couple of forces defined by a product of two centrifugal forces generated through rotation of the two auxiliary eccentric weight rotors and a distance between lines of action of the two centrifugal forces have mutually the same magnitude and have opposite rotation directions.

In the repeated moment generation device, the two principal bearing members and the two pairs of auxiliary bearing members can be provided at a table member such that shaft centers of shaft bodies of the principal eccentric weight rotors and shaft centers of shaft bodies of the auxiliary eccentric weight rotors are parallel to each other.

Note that the repeated moment generation device can also include the following configuration requirements and it is thus possible to realize simplification and downsizing of the device.

(1) The distance between rotation centers of the two principal eccentric weight rotors and the distance between rotation centers of the two auxiliary eccentric weight rotors are set to be the same.

(2) The two principal bearing members are provided to stand on the table while the two pairs of auxiliary bearing members are provided to be suspended from a lower surface of the table.

(3) The rotation centers of the two principal eccentric weight rotors and the rotation centers of the two auxiliary eccentric weight rotors are disposed to be located at four apexes of a virtual rectangle or a virtual square.

(4) Rotation surfaces of the two principal eccentric weight rotors and rotation surfaces of the two auxiliary eccentric weight rotors are disposed to be located on the same virtual plane.

(5) The principal eccentric weight rotors and the auxiliary eccentric weight rotors are caused to have the same shape, structure, and size.

Advantageous Effect of Invention

According to the present invention, it is possible to provide a repeated moment generation device capable of realizing size reduction, weight reduction, and noise reduction for a fatigue testing machine.

DESCRIPTION OF EMBODIMENTS

Figure 1:
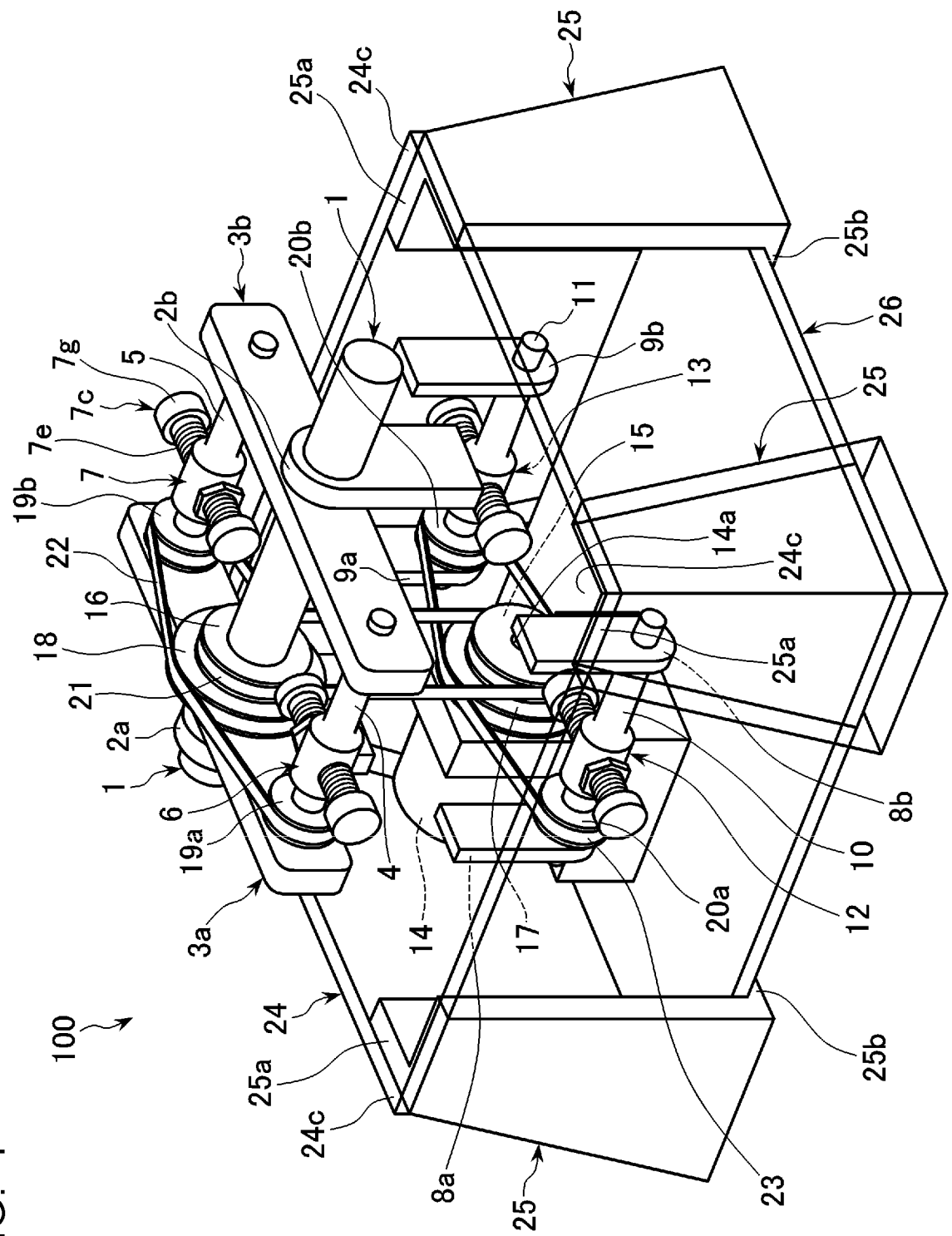
FIG. 1 is a partially omitted perspective view illustrating a repeated moment generation device according to an embodiment of the present invention.

Hereinafter, a repeated moment generation device 100 according to an embodiment of the present invention will be described on the basis of FIGS. 1 to 7. Note that some of components, such as a table 24 and a support member 25, are displayed in a transparent manner to enhance visibility in FIGS. 1 to 7. Also, the reference signs described in the explanation in paragraphs [0016] to [0052] correspond only to the reference signs described in the drawings [FIG. 1] to [FIG. 7], respectively, and do not correspond to the reference signs described in the drawings other than the drawings [FIG. 1] to [FIG. 7]

First, a structure, a function, and the like of the repeated moment generation device 100 according to the present embodiment will be described on the basis of FIGS. 1 and 2. As illustrated in FIG. 1, the repeated moment generation device 100 includes: a principal shaft 1 that is for transmitting a repeated moment; principal bearing members 2*a*, 2*b* that are provided to stand on an upper surface of the table 24 at a predetermined distance therebetween to rotatably hold the principal shaft 1; a pair of lever members 3*a*, 3*b* that are attached to the principal shaft 1 at positions that are separated in a direction of a shaft center 1*c* of the principal shaft 1 in a state in which each of the lever members 3a and 3b perpendicularly intersects the principal shaft 1; shaft bodies 4 and 5 that are provided such that the shaft bodies 4, 5 are rotatable about shaft centers 4c, 5c (see FIG. 2) that are parallel to the principal shaft 1, respectively, at symmetrical positions with the principal shaft 1 interposed therebetween in a region where the lever members 3a, 3b face each other; principal eccentric weight rotors 6, 7 that are provided to be rotatable along with the shaft bodies 4, 5 around the shaft centers 4c, 5c; and the like.

The table 24 is a quadrangular flat plate-shaped member and is maintained in a horizontal state by four support members 25 disposed at four corner portions 24c thereof on the lower surface side. The support members 25 have L-shape horizontal sections and are provided with bottom plates 25b on the lower surface side. The four corner portions 24c of the table 24 are fixed in a state in which the corner portions 24c are placed on upper surfaces 25a of the four support members 25, respectively, and a quadrangular flat plate-shaped bottom table 26 is disposed on the bottom plates 25b located at the four positions.

The lower surface of the table 24 that is a member continued from the principal bearing members 2a, 2b is provided with a plurality of auxiliary bearing members 8a, 8b, 9a, 9b in a suspended manner, a shaft body 10 having a shaft center 10c (see FIG. 3) that is parallel with the principal shaft 1 is disposed to be rotatable about the shaft center 10c between the facing auxiliary bearing members 8a, 8b, and a shaft body 11 having a shaft center 11c that is parallel with the principal shaft 1 is disposed to be rotatable about the shaft center 11c between the facing auxiliary bearing members 9a, 9b. The auxiliary eccentric weight rotor 12 is rotatable along with the shaft body 10, and the auxiliary eccentric weight rotor 13 is rotatable along with the shaft body 11.

Since the principal eccentric weight rotors 6, 7 and the auxiliary eccentric weight rotors 12, 13 have the same size, structure, function, and the like, the principal eccentric weight rotor 7 will be described below. As illustrated in FIG. 2, the principal eccentric weight rotor 7 includes a columnar diameter expanded portion 7b that is formed at a part of the shaft body 5 and a weight member 7c that is attached with the diameter expanded portion 7b penetrating in a direction that is orthogonal to the shaft center 5c.

The weight member 7c includes a bolt member 7e that is screwed to penetrate through the diameter expanded portion 7b, a weight 7g that is attached to an end portion of the bolt member 7e, and a locking nut 7d that is screwed onto the bolt member 7e to lock the bolt member 7e at the diameter expanded portion 7b. A male screw is formed on the outer circumference of the bolt member 7e, and an end portion of the weight member 7c on the opposite side is provided with a short columnar-shaped stopper portion 7f with a diameter expanded as compared with the male screw portion.

The bolt member 7e having a male screw at the outer circumference thereof is screwed in a state in which it penetrates through the diameter expanded portion 7b having a female screw hole (corresponding to the female screw hole 6h in FIG. 2), and it is possible to decenter a center of gravity 7G (see FIG. 3) of the weight member 7c in a direction away from the shaft center 5c by causing the bolt member 7e to rotate about the shaft center thereof, causing the bolt member 7e to move in a longitudinal direction, and thereby changing the distance between the weight 7g and the shaft center 5c of the shaft body 5.

If the principal eccentric weight rotor 7 rotates with rotation of the shaft body 5 that rotates due to a drive force of a motor 14 as will be described later in a state in which the center of gravity 7G of the weight member 7c is decentered from the shaft center 5c, then the weight member 7c also rotates about the shaft center 5c, and a centrifugal force 7a with the size determined by the amount of eccentricity of the center of gravity 7G and the number of times of rotation is generated in the shaft center direction of the bolt member 7e. Since a direction in which the centrifugal force 7a acts rotates about the shaft center 5c, a force changing in up-down and left-right directions with the rotation is transmitted to the shaft body 5 and members coupled to the shaft body 5. The principal eccentric weight rotor 6 and the auxiliary eccentric weight rotors 12 and 13 also have functions that are similar to that of the principal eccentric weight rotor 7.

As drive means for causing the two principal eccentric weight rotors 6 and 7 and the two auxiliary eccentric weight rotors 12 and 13 to synchronously rotate, the motor 14, middle timing pulleys 15, 16, large timing pulleys 17, 18, small timing pulleys 19a, 19b, 20a, 20b, and timing belts 21, 22, 23 are included.

The middle timing pulley 15 and the large timing pulley 17 are attached to a rotation shaft 14a of the motor 14, and the middle timing pulley 16 and the large timing pulley 18 are attached to the principal shaft 1 via a bearing. The rotation shaft 14a of the motor 14 is parallel with the principal shaft 1, the middle timing pulley 15 and the large timing pulley 17 on the side of the motor 14 are located immediately below the middle timing pulley 16 and the large timing pulley 18 on the side of the principal shaft 1, and the middle timing pulleys 15, 16 and the large timing pulleys 17 and 18 are disposed to face each other such that the middle timing pulleys 15 and 16 are disposed in series and the large timing pulleys 17 and 18 are disposed in series, in the up-down direction.

The small timing pulleys 19a, 19b are attached to the shaft bodies 4, 5, and small timing pulleys 20a, 20b are attached to the shaft bodies 10, 11. The small timing pulleys 19a, 19b are disposed in series with the large timing pulley 18 interposed therebetween, and the small timing pulleys 20a, 20b are disposed in series with the large timing pulley 17 interposed therebetween. The sizes (outer diameters) of the small timing pulleys 19a, 19b, 20a, 20b are the same, the sizes (outer diameters) of the middle timing pulleys 15, 16 are also the same, and the sizes (outer diameters) of the large timing pulleys 17, 18 are also the same.

The middle timing pulley 15 and the middle timing pulley 16 are interlocked by the timing belt 21, the small timing pulleys 19a, 19b and the large timing pulley 18 are interlocked by the timing belt 22, and the small timing pulleys 20a, 20b and the large timing pulley 17 are interlocked by the timing belt 23.

If the motor 14 is activated, the large timing pulley 17 and the middle timing pulley 15 attached integrally to the rotation shaft 14a rotate in the same direction the same number of times of rotation, the rotation of the middle timing pulley 15 is transmitted to the middle timing pulley 16 via the timing belt 21, and the middle timing pulleys 15, 16 rotate in the same direction the same number of times of rotation as those of the rotation shaft 14a of the motor 14. The rotation of the middle timing pulley 16 is transmitted to the large timing pulley 18 integrated with the middle timing pulley 15 via the principal shaft 1, and the large timing pulleys 17, 18 thus rotate in the same direction the same number of times of rotation.

The rotation of the large timing pulley 17 is transmitted to the small timing pulleys 20a, 20b via the timing belt 23, the rotation of the large timing pulley 18 is transmitted to the small timing pulleys 20a, 20b via the timing belt 22, and the shaft bodies 4, 5, 10, 11 to which the small timing pulleys 19a, 19b, 20a, 20b are attached, respectively, rotate in the mutually same direction the same number of times of rotation.

Figure 3:
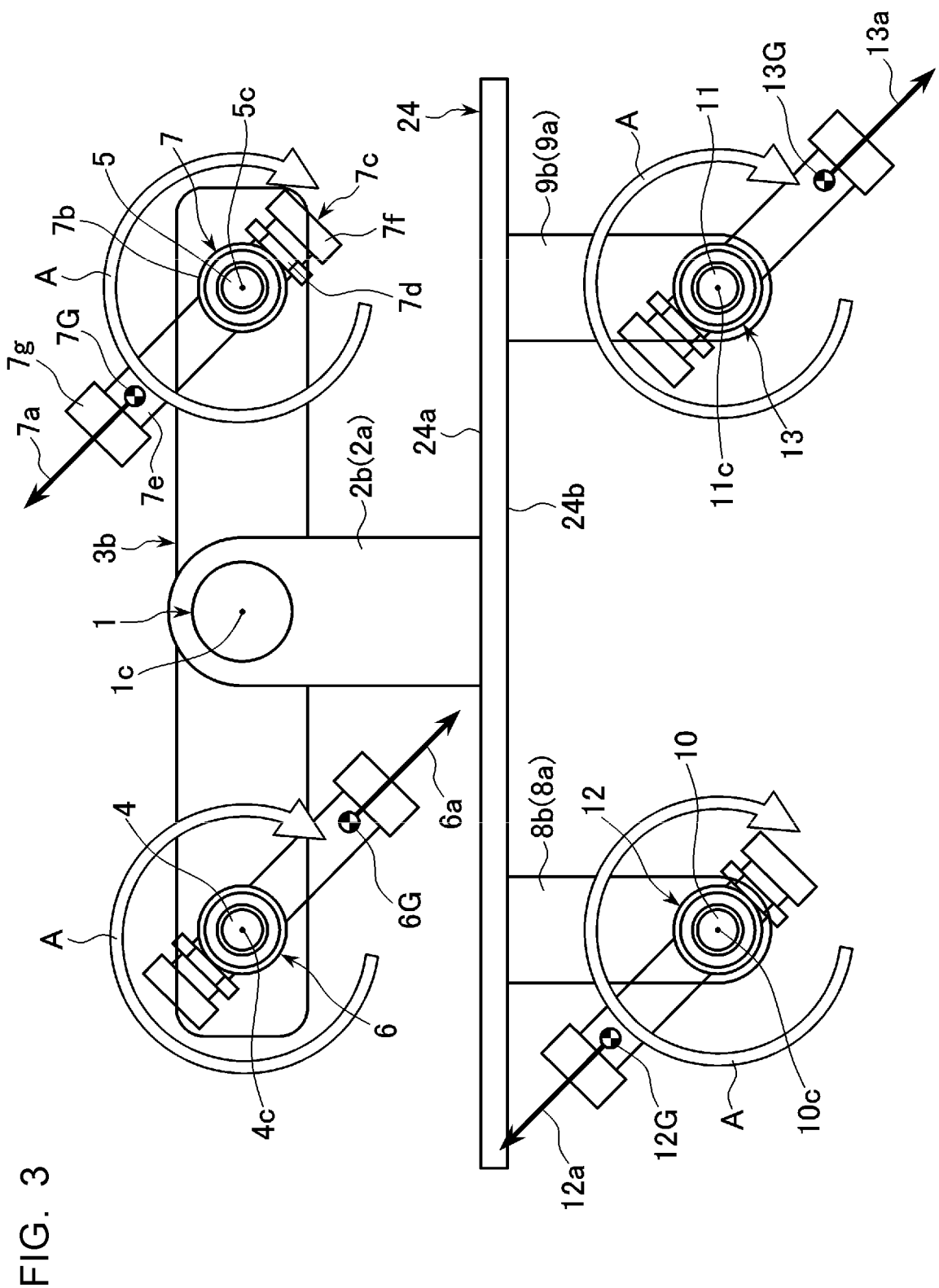
FIG. 3 is a partially omitted explanatory diagram illustrating rotating states of a principal eccentric weight rotor and an auxiliary eccentric weight rotor in the repeated moment generation device illustrated in FIG. 1.
Figure 4:
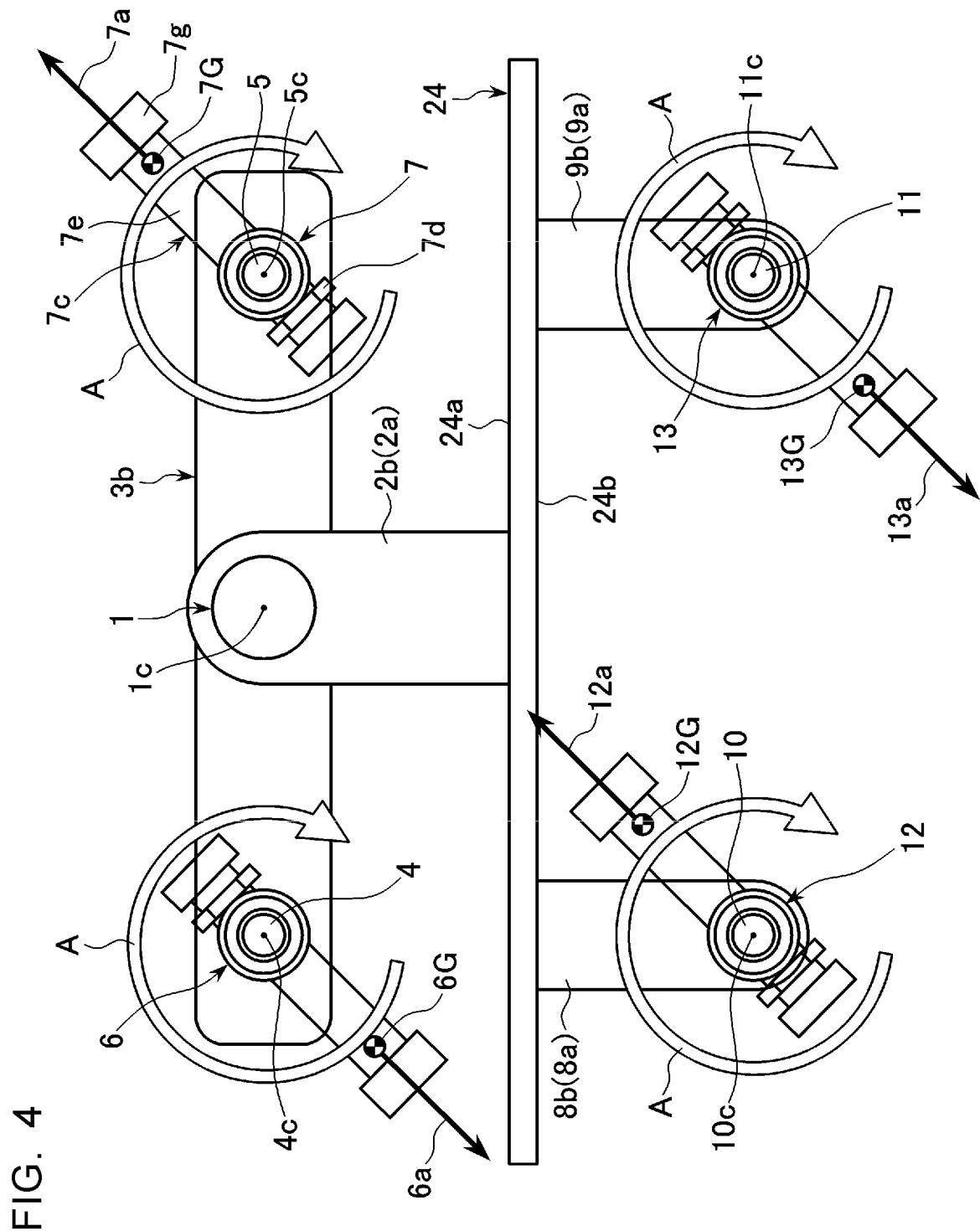
FIG. 4 is a partially omitted explanatory diagram illustrating rotating states of the principal eccentric weight rotor and the auxiliary eccentric weight rotor in the repeated moment generation device illustrated in FIG. 1.
Figure 5:
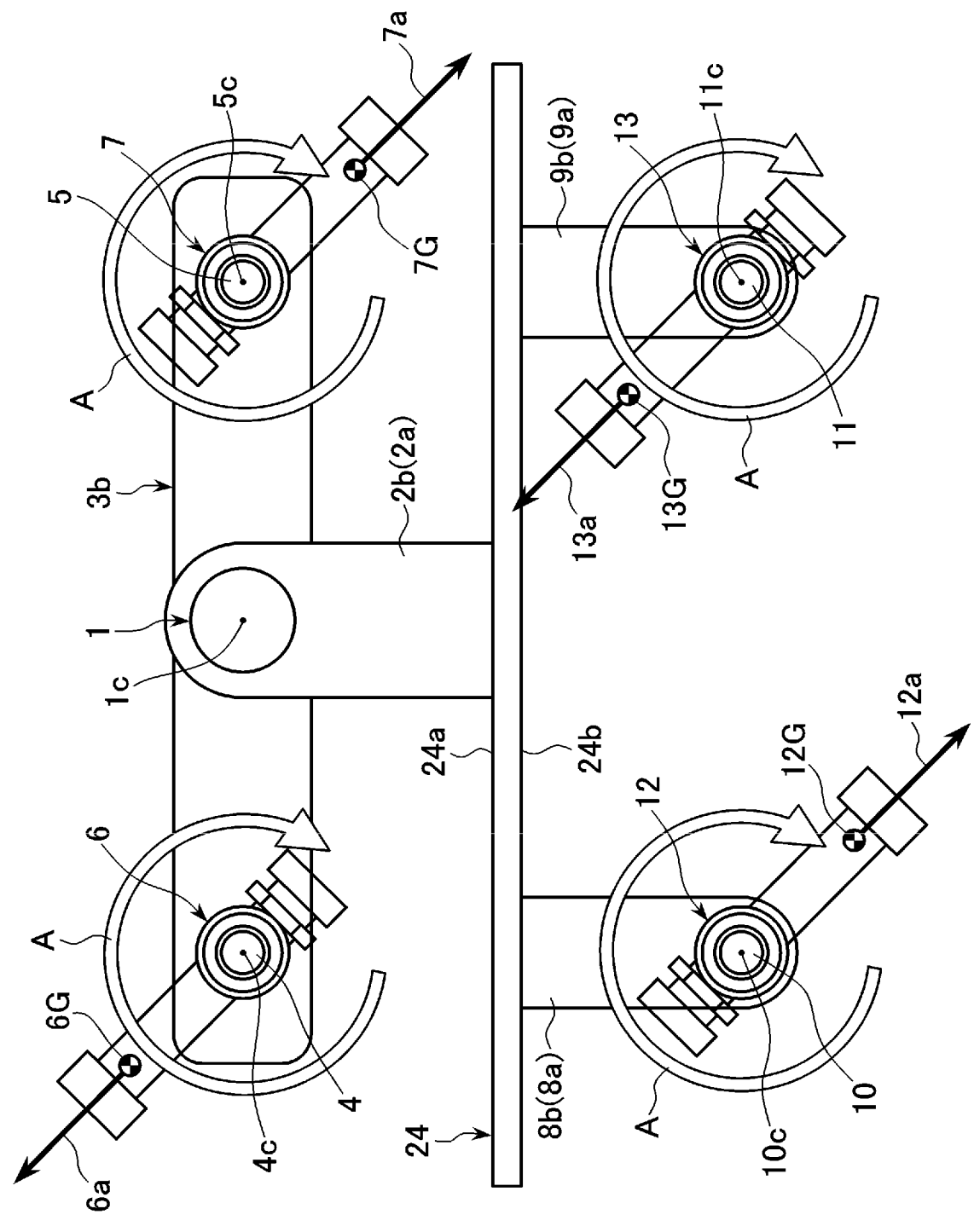
FIG. 5 is a partially omitted explanatory diagram illustrating rotating states of the principal eccentric weight rotor and the auxiliary eccentric weight rotor in the repeated moment generation device illustrated in FIG. 1.
Figure 6:
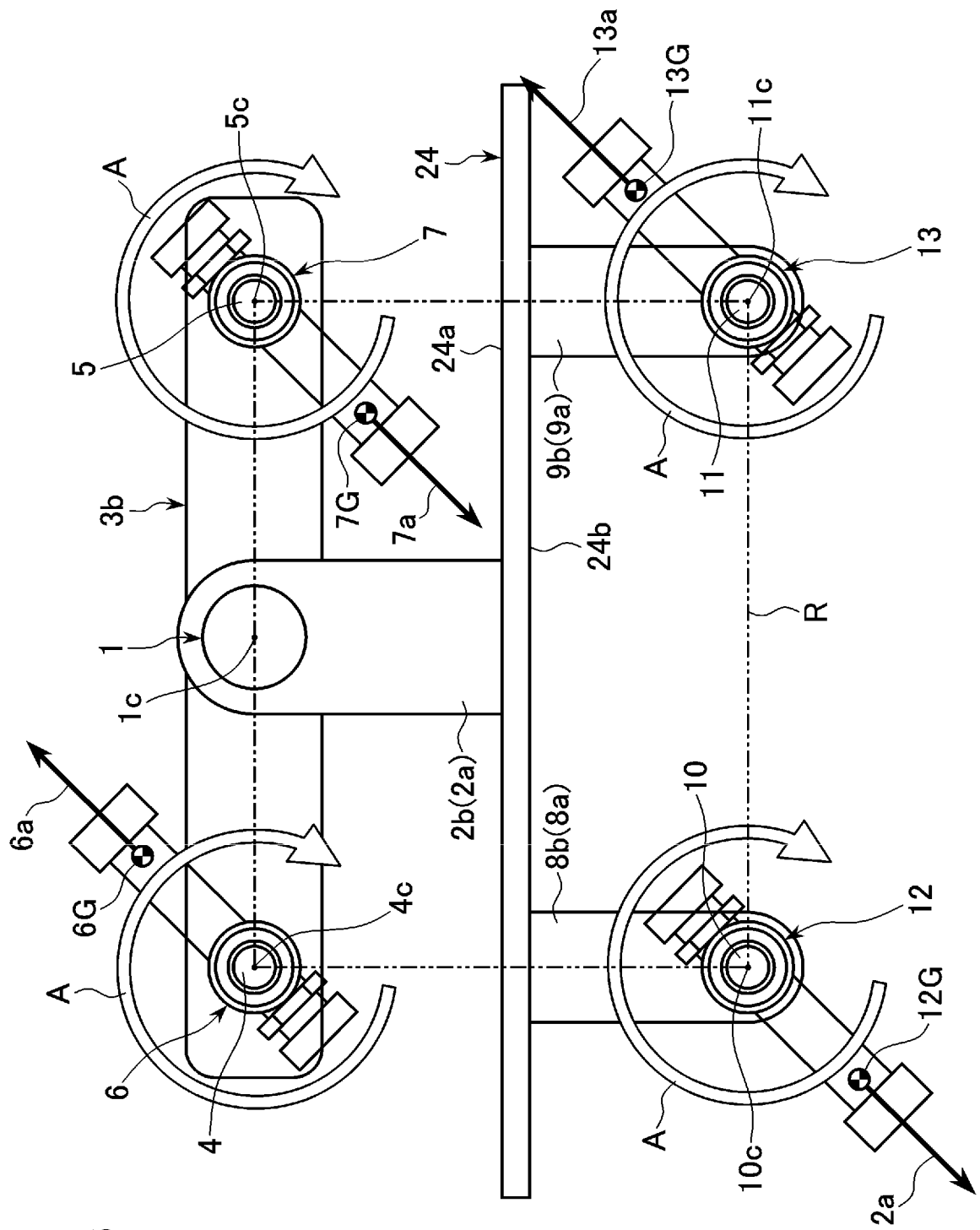
FIG. 6 is a partially omitted explanatory diagram illustrating rotating states of the principal eccentric weight rotor and the auxiliary eccentric weight rotor in the repeated moment generation device illustrated in FIG. 1.

Therefore, the two principal eccentric weight rotors 6, 7 and the two auxiliary eccentric weight rotors 12, 13 mutually synchronously rotate in the same direction at the same rotation frequency as illustrated in FIG. 3, which will be described later. Note that in the repeated moment generation device 100, rotational center lines of the two principal eccentric weight rotors 6, 7 are the same as the shaft centers 4c, 5c of the shaft bodies 4, 5, respectively, and rotational center lines of the two auxiliary eccentric weight rotors 12, 13 are the same as the shaft centers 10c, 11c of the shaft bodies 10, 11, respectively.

In the repeated moment generation device 100 illustrated in FIG. 1, the two principal eccentric weight rotors 6, 7 are disposed such that eccentricity directions of the centers of gravity 6G, 7G (the directions of the centrifugal forces 6a, 7a) are different from each other by 180 degrees around the shaft centers 4c, 5c, of the shaft bodies 4, 5 thereof as illustrated in FIG. 3. Also, the two auxiliary eccentric weight rotors 12, 13 are disposed such that eccentricity directions of the centers of gravity 12G, 13G thereof (the directions of the centrifugal forces 12a, 13a) are different from each other by 180 degrees around the shaft centers 10c, 11c of the shaft bodies 10, 11 thereof. Furthermore, disposition is made such that the eccentricity direction of the principal eccentric weight rotor 6, which corresponds to one of the principal eccentric weight rotors, (the direction of the centrifugal force 6a) and the eccentricity direction of the auxiliary eccentric weight rotor 12 (the direction of the centrifugal force 12a) located on the same side as the principal eccentric weight rotor 6 with respect to the principal shaft 1 are different from each other by 180 degrees around the shaft centers 4c, 10c of the shaft bodies 4, 10 thereof.

Next, effects, advantages, and the like of the two principal eccentric weight rotors 6, 7 and the two auxiliary eccentric weight rotors 12, 13 in the repeated moment generation device 100 illustrated in FIG. 1 will be described on the basis of FIGS. 3 to 7.

If the motor 14 is activated in the repeated moment generation device 100 illustrated in FIG. 1, each of the two principal eccentric weight rotors 6, 7 and the two auxiliary eccentric weight rotors 12, 13 rotates in the clockwise direction (the arrow A direction) the same number of times of rotation as illustrated in FIG. 3.

FIGS. 3 to 6 display states in which the two principal eccentric weight rotors 6, 7 and the two auxiliary eccentric weight rotors 12, 13 rotate with elapse of time in order. The two principal eccentric weight rotors 6, 7 rotate while maintaining a relationship in which the directions of the centrifugal forces 6a, 7a thereof are different from each other by 180 degrees around the rotational center lines (shaft centers 4c, 5c), and the two auxiliary eccentric weight rotors 12, 13 rotate while maintaining a relationship in which the directions of the centrifugal forces 12a, 13a thereof are different from each other by 180 degrees around the rotational center lines (shaft centers 10c, 11c).

As illustrated in FIGS. 3 to 6, the two centrifugal forces 6a, 7a generated through rotation of the two principal eccentric weight rotors 6, 7 have mutually the same magnitude and have acting directions that are opposite by 180 degrees, and the two centrifugal forces 12a, 13a generated through rotation of the two auxiliary eccentric weight rotors 12, 13 have mutually the same magnitude and have acting directions that are opposite by 180 degrees.

Also, a couple of forces defined by a product of the two centrifugal forces 6a, 7a generated through rotation of the two principal eccentric weight rotors 6, 7 and the distance between lines of action of the two centrifugal forces 6a, 7a and a couple of forces defined by a product of the two centrifugal forces 12a, 13a generated through rotation of the two auxiliary eccentric weight rotors 12, 13 and the distance between lines of action of the two centrifugal forces 12a, 13a have mutually the same magnitude and have rotation directions that are opposite.

Furthermore, the two principal bearing members 2a, 2b and the two pairs of auxiliary bearing members 8a, 8b, 9a, 9b are disposed on the table 24 such that the shaft centers 4c, 5c of the shaft bodies 4, 5 of the principal eccentric weight rotors 6, 7 and the shaft centers 10c, 11c of the shaft bodies 10, 11 of the auxiliary eccentric weight rotors 12, 13 are parallel to each other.

The two principal eccentric weight rotors 6, 7 rotate while maintaining a relationship in which the directions of the centrifugal forces 6a, 7a thereof are different from each other by 180 degrees around the rotational center lines (shaft centers 4c, 5c), and the two auxiliary eccentric weight rotors 12, 13 rotate while maintaining a relationship in which the directions of the centrifugal forces 12a, 13a thereof are different from each other by 180 degrees around the rotational center lines (shaft centers 10c, 11c).

Also, when the two principal eccentric weight rotors 6, 7 and the two auxiliary eccentric weight rotors 12, 13 rotate, the direction of the centrifugal force 6a of the principal eccentric weight rotor 6, which is one of the principal eccentric weight rotors, and the direction of the centrifugal force 12a of the auxiliary eccentric weight rotor 12 located on the same side as the principal eccentric weight rotor 6 with respect to the principal shaft 1 maintain a relationship in which they are different from each other by 180 degrees around the rotational center lines (shaft centers 4c, 10c) thereof.

Since vibration is generated by the two principal eccentric weight rotors 6, 7 rotating about the rotational center lines (shaft centers 4c, 5c) thereof, and the vibration causes both end portions of the lever member 3b to alternately vibrate in the up-down direction via the shaft bodies 4, 5, the lever member 3b repeats minute seesaw movement around the shaft center 1c of the principal shaft 1, and the principal shaft 1 integrated with the lever member 3b thus repeats minute forward/reverse rotation. Therefore, if a test piece (not illustrated) is set on extension of the shaft center 1c of the principal shaft 1, then it is possible to impart a repeated load (repeated moment) on the test piece.

Figure 7:
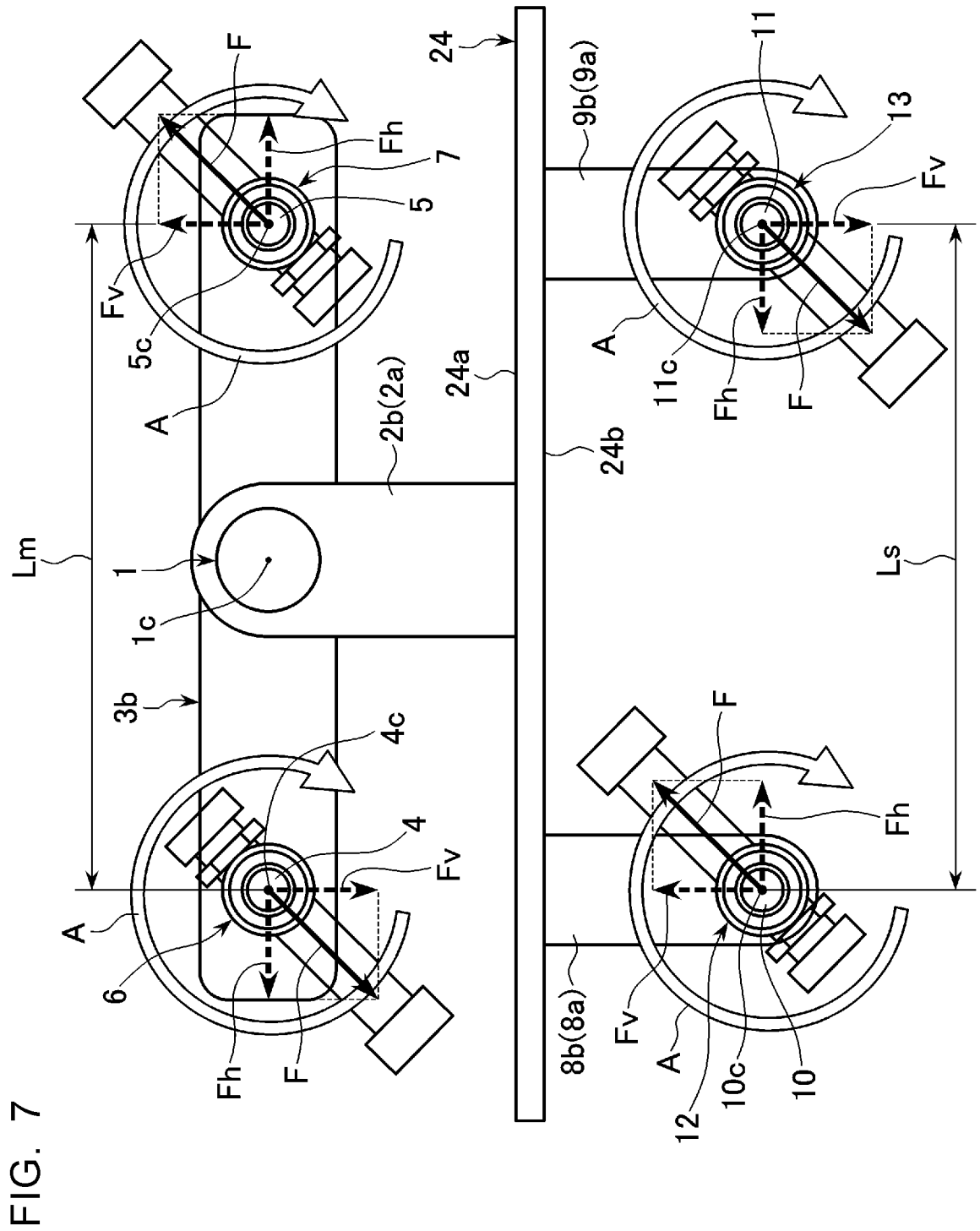
FIG. 7 is a partially omitted explanatory diagram illustrating a cancel effect of an unbalance force in the state illustrated in FIG. 4.

As illustrated in FIG. 7, when the principal eccentric weight rotors 6, 7 and the auxiliary eccentric weight rotors 12, 13 rotate with the same amount of eccentricity at the same rotation frequency, centrifugal forces F, F, F, F with the same magnitude are generated in the shaft bodies 4, 5, 10, 11, respectively.

If these centrifugal forces F are considered separately as forces in two directions that are orthogonal to each other (a horizontal force component Fh and a vertical force component Fv), the horizontal force component Fh and the vertical force component Fv in the principal eccentric weight rotor 6 and the horizontal force component Fh and the vertical force component Fv in the principal eccentric weight rotor 7 have mutually the same force magnitude in the vertical direction and the horizontal direction and have force directions that are opposite by 180 degrees, and the forces in the vertical direction and the horizontal direction are thus cancelled out by each other and satisfy a force balanced condition.

Similarly, the horizontal force component Fh and the vertical force component Fv in the auxiliary eccentric weight rotor 12 and the horizontal force component Fh and the vertical force component Fv in the auxiliary eccentric weight rotor 13 have mutually the same force magnitude in the vertical direction and the horizontal direction and have force directions that are opposite by 180 degrees, the forces in the vertical direction and the horizontal direction are thus cancelled out and satisfy the force balanced condition.

Therefore, since all the forces generated in the structure including the principal eccentric weight rotors 6, 7 and the auxiliary eccentric weight rotors 12, 13 illustrated in FIG. 7 always satisfy the force balanced condition, and the structure illustrated in FIG. 7 does not perform translational movement in all the directions, a test machine (not illustrated) coupled to the structure illustrated in FIG. 7 also does not perform translational movement.

While the horizontal force components Fh in the principal eccentric weight rotors 6, 7 out of the horizontal force components Fh and the vertical force components Fv act in the same axial direction and thus do not generate a couple of forces, the vertical force components Fv have mutually the same magnitude and have directions that are opposite by 180 degrees, and act separately with a distance Lm between the shaft bodies 4 and 5, and thus generate a couple of forces (that is, a moment) with the magnitude Mm=Fv×Lm defined by a product of the vertical force components Fv and the distance Lm, and the moment Mm is transmitted through the principal shaft 1, acts on the test piece (not illustrated) coupled to the principal shaft 1, and is further transmitted to the testing machine through a member (not illustrated) that fixes the test piece to the testing machine.

Also, while the horizontal force components Fh in the auxiliary eccentric weight rotors 12, 13 act in the same axial direction and thus do not generate a couple of forces, the vertical force components Fv have mutually the same magnitude and have directions that are opposite by 180 degrees, act separately with a distance Ls between the shaft bodies 10, 11, thus generate a couple of forces (that is, a moment) with the magnitude Ms=Fv×Ls defined by a product of the vertical force components Fv and the distance Ls, and the moment Ms is transmitted to the table 24 through the auxiliary bearing members 8a, 8b, 9a, 9b that support the auxiliary eccentric weight rotors 12, 13, and is then transmitted to the testing machine (not illustrated) coupled to the table 24.

Since the rotation axes of the moment Mm and the moment Ms are parallel to each other, always have the same magnitude, and have rotation directions acting in opposite directions, the moment Mm and the moment Ms are canceled out and satisfy a moment balanced condition. Therefore, the testing machine (not illustrated) does not perform rotational movement.

Also, the cancellation relationships of the centrifugal forces and the moments generated by the principal eccentric weight rotors 6, 7 and the auxiliary eccentric weight rotors 12, 13 are also established regardless of which directions the centrifugal forces F are directed to (regardless of what kind of postures the principal eccentric weight rotors 6, 7 and the auxiliary eccentric weight rotors 12, 13 are in around the shaft centers 4c, 5c, 10c, 11c) as illustrated in FIGS. 3 to 6.

In this manner, the centrifugal forces generated through rotation of the principal eccentric weight rotors 6, 7 and the auxiliary eccentric weight rotors 12, 13 theoretically do not serve as factors causing translational movement and rotational movement of the testing machine, and it is possible to achieve vibration reduction (theoretically, elimination of vibration) and noise reduction since it keeps the state with no motion during an operation.

Also, since it is not necessary to provide vibration control means, vibration isolation means, sound isolation means, and the like, if the aforementioned vibration reduction (theoretically, elimination of vibration) and noise reduction are realized, it is also possible to realize size reduction of the repeated moment generation device 100. Moreover, since it is not necessary to increase the mass of the testing machine as in the related art for the purpose of curbing vibration, it is also possible to realize weight reduction of the testing machine.

Furthermore, since the repeated moment generation device 100 includes the following configuration requirements as illustrated in FIGS. 3 to 6, it is possible to realize simplification and downsizing of the device.

(1) The distance between rotation centers of the two principal eccentric weight rotors 6, 7 (the distance between the shaft centers 4c, 5c) and the distance between rotation centers of the two auxiliary eccentric weight rotors 12, 13 (the distance between the shaft centers 10c, 11c) are set to be the same.

(2) The two principal bearing members 2a, 2b are provided to stand on the table 24 while the two pairs of auxiliary bearing members 8a, 8b, 9a, 9b are provided to be suspended from a lower surface of the table 24.

(3) The rotation centers (shaft centers 4c, 5c) of the two principal eccentric weight rotors 6, 7 and the rotation centers (shaft centers 10c, 11c) of the two auxiliary eccentric weight rotors 12, 13 are disposed to be located at four apexes of a virtual rectangle R.

(4) Rotation surfaces of the two principal eccentric weight rotors 6, 7 and rotation surfaces of the two auxiliary eccentric weight rotors 12, 13 are disposed to be located on the same virtual plane.

(5) The principal eccentric weight rotors 6, 7 and the auxiliary eccentric weight rotors 12, 13 are caused to have the same shape, structure, and size.

Note that the repeated moment generation device 100 described on the basis of FIGS. 1 to 7 is an example of the repeated moment generation device according to the present invention, and the repeated moment generation device according to the present invention is not limited to the aforementioned repeated moment generation device 100.

Next, repeated moment generation devices 100, 200 according to other embodiments will be described on the basis of FIGS. 8 to 11. Note that some of components are expressed in a transparent manner in order to enhance visibility in FIGS. 8 to 11. Also, the reference signs described in the explanation in the paragraphs [0053] to [0092] correspond only to the reference signs described in the drawings [FIG. 8] to [FIG. 11], respectively, and do not correspond to the reference signs described in the drawings other than the drawings [FIG. 8] to [FIG. 11].

Figure 8:
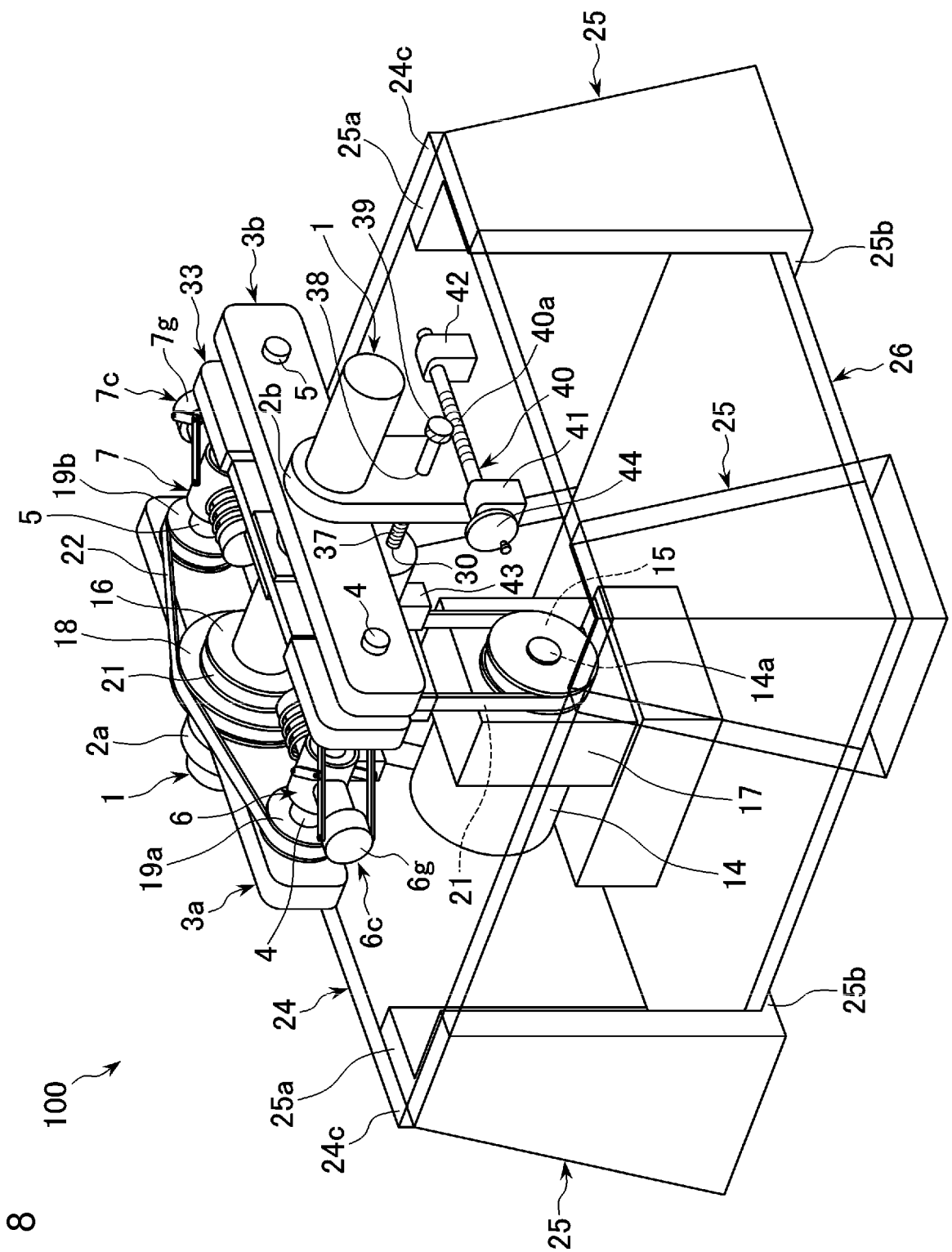
FIG. 8 is a partially omitted perspective view illustrating a repeated moment generation device according to another embodiment.
Figure 9:
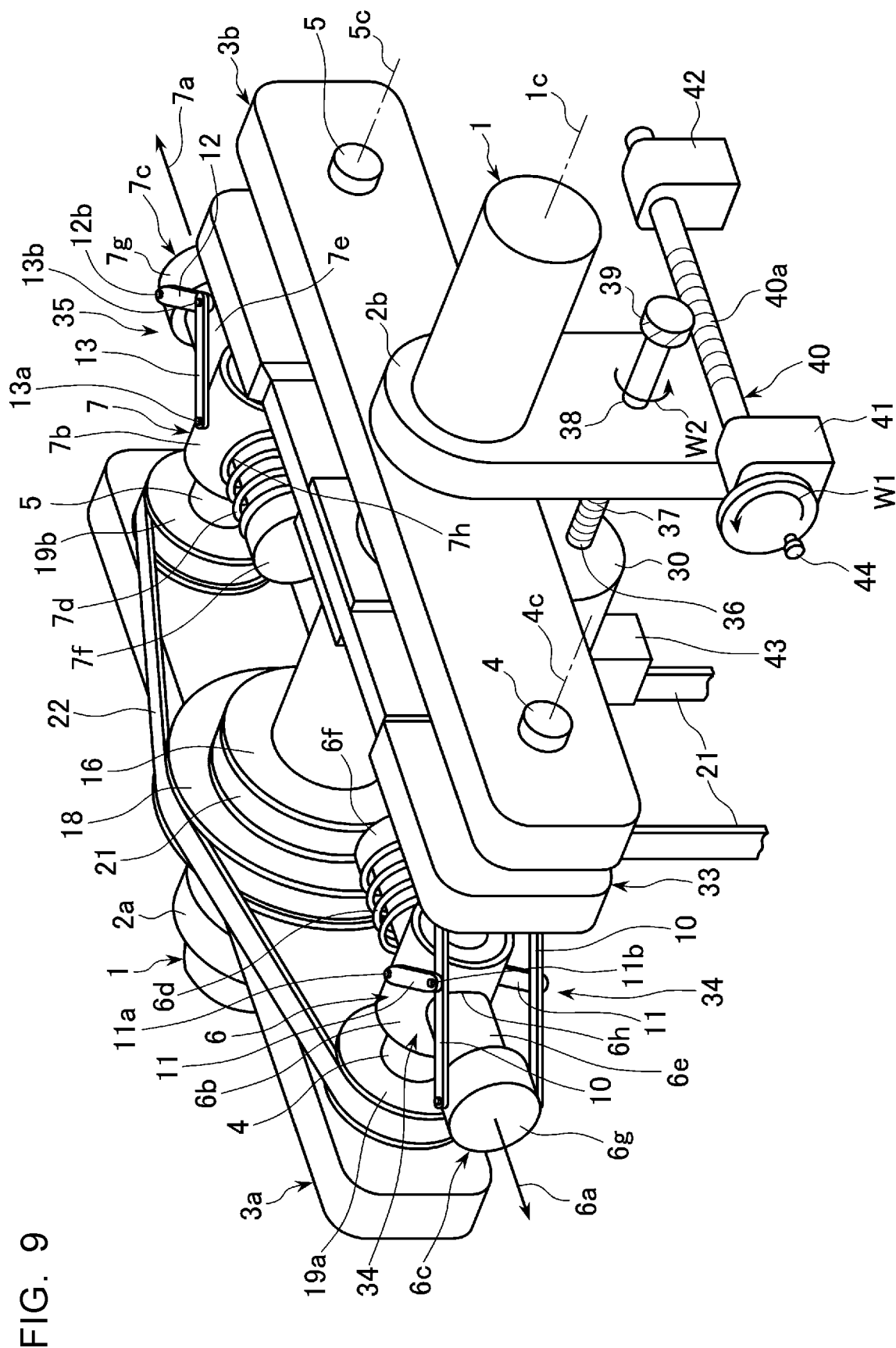
FIG. 9 is a partially enlarged view of FIG. 8.

First, the repeated moment generation device 100 will be described on the basis of FIGS. 8 to 10. As illustrated in FIGS. 8 and 9, the repeated moment generation device 100 is used for a fatigue testing machine (not illustrated) adapted to load a repeated moment on a test piece to test a fatigue strength property. The repeated moment generation device 100 includes: a principal shaft 1 that is for transmitting a repeated moment to a test piece (not illustrated) set in the fatigue testing machine; principal bearing members 2a, 2b that are provided to stand on an upper surface of a table 24 for rotatably holding the principal shaft 1 at a predetermined distance therebetween; a pair of lever members 3a, 3b that are attached to the principal shaft 1 in a state in which each of the lever members 3a, 3b perpendicularly intersects the principal shaft 1, at positions separated in a direction of a shaft center 1c of the principal shaft 1; shaft bodies 4, 5 that are provided to be rotatable about shaft centers 4c, 5c (see FIG. 9) that are parallel to the principal shaft 1 at symmetrical positions with the principal shaft 1 interposed therebetween in a region where the lever members 3a, 3b face each other; eccentric weight rotors 6, 7 that rotate along with the shaft bodies 4, 5 around the shaft centers 4c, 5c; and the like.

As illustrated in FIG. 9, the eccentric weight rotors 6, 7 include diameter expanded portions 6b, 7b that are provided at parts of the shaft bodies 4, 5, respectively, and eccentric weight members 6c, 7c that are inserted into through-holes 6h, 7h opened in the diameter expanded portions 6b, 7b in directions that are orthogonal to the shaft centers 4c, 5c in a state in which the eccentric weight members 6c, 7c perpendicularly intersect the shaft bodies 4, 5 and are slidable in the directions that are orthogonal to the shaft bodies 4, 5. Also, a motor 14 that is drive means for causing the shaft bodies 4, 5 to synchronously rotate is included.

The eccentric weight members 6c, 7c include columnar main body portions 6e, 7e and stoppers 6f, 6g, 7f, 7g that are provided at both end portions of the main body portions 6e, 7e in short columnar shapes with increased diameters as compared with inner diameters of the through-holes 6h, 7h. The main body portions 6e, 7e are slidable in a state in which the outer circumferential surfaces thereof are in contact with inner circumferential surfaces of the through-holes 6h, 7h, and sliding distances of the eccentric weight members 6c, 7c with respect to the shaft bodies 4, 5 are limited to the lengths of the main body portions 6e, 7e by the stoppers 6f, 6g (7f, 7g), respectively.

Springs 6d, 7d that are elastic members are disposed in the surroundings of parts located between the stoppers 6f, 7f, which are one of the stoppers 6f, 6g and one of the stoppers 7f, 7g, of the main body portions 6e, 7e of the eccentric weight members 6c, 7c and the diameter expanded portions 6b, 7b of the shaft bodies 4, 5, and both end portions of the springs 6d (7d) are locked by the diameter expanded portions 6b (7b) and the stoppers 6f (7f), respectively. In a state in which no external force in the longitudinal direction is applied to the eccentric weight members 6c, 7c, the springs 6d (7d) couple the stoppers 6f (7f) to the diameter expanded portions 6b (7b) of the shaft bodies 4 (5) to hold the state in which the centers of gravity of the eccentric weight members 6c (7c) are located at the shaft centers 4c (5c) of the shaft bodies 4 (5), respectively.

Figure 10:
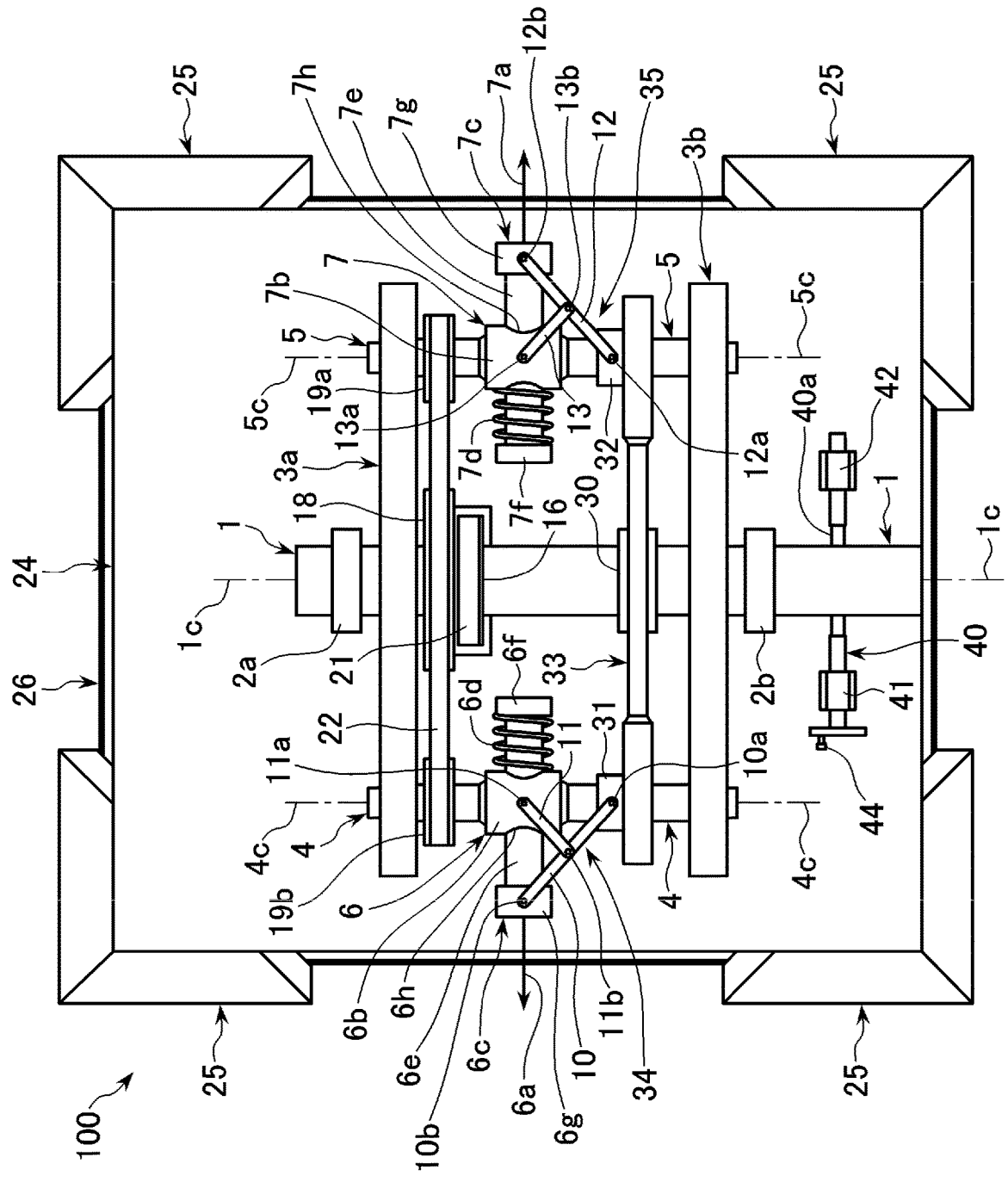
FIG. 10 is a partially omitted plan view of the repeated moment generation device illustrated in FIG. 8.

As illustrated in FIG. 10, a slider 30 is attached to an outer circumference of a part of the principal shaft 1 between the lever members 3a, 3b. The slider 30 is slidable along the direction of the shaft center 1c of the principal shaft 1, and the principal shaft 1 is able to idle with respect to the slider 30. Also, sliders 31 (32) are attached to outer circumferences of parts of the shaft bodies 4 (5) between the eccentric weight rotors 6 (7) and the lever member 3b. The sliders 31 (32) are slidable along the directions of the shaft centers 4c (5c) of the shaft bodies 4 (5), and the shaft bodies 4 (5) are able to idle with respect to the sliders 31 (32).

On the other hand, an interlocking member 33 that integrally couples the sliders 30, 31, 32 is provided in order to synchronize movement of the sliders 30, 31, 32 in the longitudinal directions of the shaft centers 1c, 4c, 5c. The interlocking member 33 is disposed at a part between the eccentric weight rotors 6, 7 and the lever member 3b such that the interlocking member 33 perpendicularly intersects the principal shaft 1 and the shaft bodies 4, 5 and is parallel to the lever members 3a, 3b.

Link mechanisms 34 (35) are provided as joining means for converting sliding motion caused when the sliders 31 (32) slide in the directions of the shaft centers 4c (5c) of the shaft bodies 4 (5) by causing the interlocking member 33 to move along the direction of the shaft center 1c using operation means, which will be described later, into sliding motion in directions that are orthogonal to the shaft centers 4c (5c) of the shaft bodies 4 (5) of the eccentric weight members 6c (7c) and transmitting the sliding motion to the eccentric weight members 6c (7c).

The link mechanisms 34 (35) include first link members 10 (12) and second link members 11 (13). The first link members 10 (12) on one end portion side are rotatably and axially supported by support shafts 10a (12a) of the sliders 31 (32), and the first link members 10 (12) on the other end portion side are rotatably and axially supported by support shafts 10b (12b) of the stoppers 6g (7g) of the eccentric weight members 6c (7c). The second link members 11 (13) on one end portion side are rotatably and axially supported by support shafts 11a (13a) of the diameter expanded portions 6b (7b) of the shaft bodies 4 (5), and the second link members 11 (13) on the other end portion side are rotatably and axially supported by support shafts 11b (13b) at the center portions of the first link members 10 (12).

Figure 2:
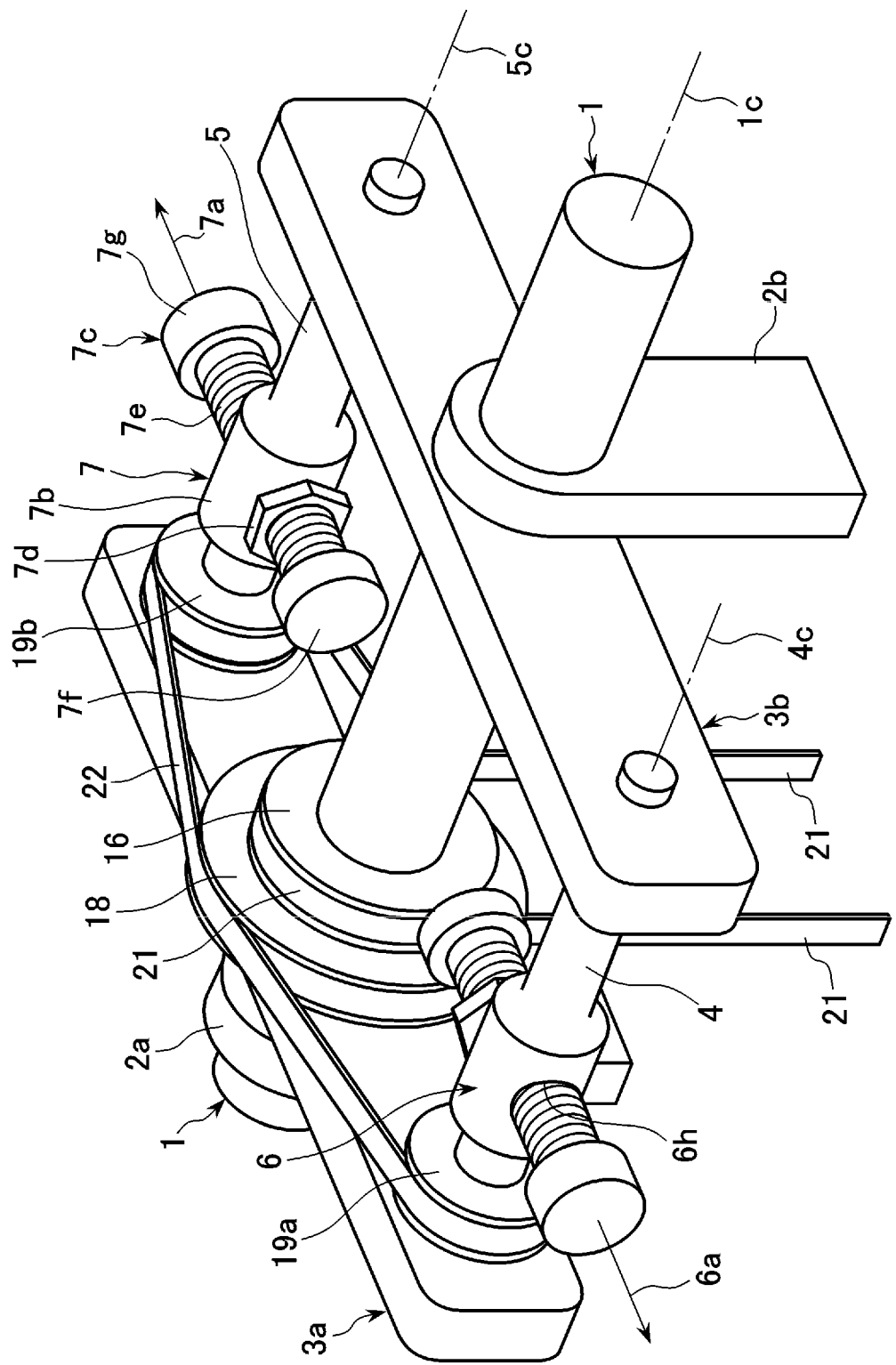
FIG. 2 is a partially omitted perspective view illustrating a part near a principal shaft of the repeated moment generation device illustrated in FIG. 1 in an enlarged manner.

Although the link mechanisms 34, 35 are displayed only on the upper surface side of the eccentric weight rotors 6, 7 in FIG. 10, the link mechanisms 34, 35 are also provided on the lower surface side of the eccentric weight rotors 6, 7 illustrated in FIG. 2, as partially illustrated near the eccentric weight rotor 6 in FIG. 9. In other words, the pairs of link mechanisms 34, 34 (35, 35) are disposed to be mirror-symmetrical with the eccentric weight rotors 6 (7) interposed therebetween.

As illustrated in FIG. 9, a male screw member 37 is screwed into a female screw hole 36 opened below the slider 30 in a state in which the male screw member 37 is parallel with the shaft bodies 4, 5 and the principal shaft 1, and one end portion (not illustrated) of the male screw member 37 is rotatably held by a bearing member 43 disposed on the table 24 immediately below the principal shaft 1. The male screw member 37 on the other end portion side is rotatably inserted into a through-hole 38 opened in the principal bearing member 2b, and a helical gear 39 is attached to the distal end of the male screw member 37 projecting from the through-hole 38. The male screw member 37 is rotatably held by the bearing member 43 and the through-hole 38 of the principal bearing member 2b in a state in which movement of the male screw member 37 in the longitudinal direction is constrained.

The helical gear 39 is attached concentrically with the male screw member 37, a rotation shaft 40 with a worm gear 40a formed thereon is disposed below the helical gear 39 to multi-level cross the male screw member 37 at a right angle, and the helical gear 39 is engaged with the worm gear 40a. Both end portions of the rotation shaft 40 are rotatably held by bearing members 41, 42 disposed on the table 24, respectively, and a handle 44 is attached to the end portion of the rotation shaft 40 projecting from the bearing member 41.

If the handle 44 is rotated, then the rotation shaft 40 and the worm gear 40a rotate, the rotation is transmitted to the helical gear 39, the male screw member 37 rotates with the rotation of the helical gear 39, and the slider 30 including the female screw hole 36 into which the male screw member 37 is screwed and the interlocking member 33 move in the longitudinal direction of the male screw member 37 (the direction of the shaft center 1c of the principal shaft 1). Along with this, the sliders 31, 32 integrated with the interlocking member 33 move in the directions of the shaft centers 4c, 5c of the shaft bodies 4, 5, and the link mechanisms 34, 35 are then activated.

If the handle 44 is rotated in the arrow W1 direction as illustrated in FIG. 9, for example, the male screw member 37 rotates in the arrow W2 direction via the worm gear 40a and the helical gear 39, and the slider 30 and the interlocking member 33 move in a direction away from the lever member 3b due to screwing between the male screw member 37 and the female screw hole 36.

In this manner, since the sliders 31, 32 integrated with the interlocking member 33 also slide in the direction away from the lever members 3b, the sliding motion is transmitted to the stoppers 6g, 7g of the eccentric weight members 6c, 7c via the link mechanisms 34, 35, the stoppers 6g, 7g move in directions away from the diameter expanded portions 6b, 7b of the shaft bodies 6, 7, respectively, and centers of gravity of the eccentric weight members 6c, 7c are separated from the shaft centers 4c, 5c of the shaft bodies 4, 5, respectively.

On the other hand, if the handle 44 is rotated in the direction opposite to the arrow W1 after an operation of rotating the handle 44 in the arrow W1 direction is performed as described above, then the male screw member 37 rotates in the direction opposite to the arrow W2 via the worm gear 40a and the helical gear 39, the slider 30 and the interlocking member 33 move in a direction approaching the lever member 3b through screwing between the male screw member 37 and the female screw hole 36, the stoppers 6g, 7g thus move in directions approaching the diameter expanded portions 6b, 7b of the shaft bodies 6, 7, respectively, and the centers of gravity of the eccentric weight members 6c, 7c approach the shaft centers 4c, 5c of the shaft bodies 4, 5, respectively in a manner opposite to that described above.

As illustrated in FIG. 10, the springs 6d, 7d disposed between the stoppers 6f, 7f, which are one of the stoppers 6f, 6g and one of the stoppers 7f, 7g, of the eccentric weight members 6c, 7c and the diameter expanded portions 6b, 7b of the shaft bodies 4, 5 couple the stoppers 6f, 7f to the shaft bodies 4, 5 to hold a state in which the centers of gravity of the eccentric weight members 6c, 7c are located at the shaft centers 4c, 5c of the shaft bodies 4, 5. In this manner, since bias forces caused by the springs 6d, 7d (forces to return the centers of gravity of the eccentric weight members 6c, 7c to the positions of the shaft centers 4c, 5c of the shaft bodies 4, 5, respectively) are continuously applied to the eccentric weight members 6c, 7c when the eccentric weight members 6c, 7c are caused to move via the link mechanisms 34, 35, it is possible to eliminate a non-continuous change in torsional moment (an influence of backlash).

Also, in a case where the link mechanisms 34, 35 are damaged during rotation of the eccentric weight rotors 6, 7 and cannot hold the eccentric weight members 6c, 7c in a predetermined state, the eccentric weight members 6c, 7c are returned to a state in which the centers of gravity thereof are located at the shaft centers 4c, 5c of the shaft bodies 4, 5 (eccentricity zero state) due to elastic restoring forces of the springs 6d, 7d, and a so-called fail safe function is also exhibited.

As illustrated in FIG. 8, the table 24 is a quadrangular flat plate-shaped member and is maintained in a horizontal state by four support members 25 disposed at four corner portions 24c on the lower surface side. The support members 25 have L-shaped horizontal sections and are provided with bottom plates 25b on the lower surface side. The four corner portions 24c of the table 24 are fixed in a state in which the corner portions 24c are placed on upper surfaces 25a of the four support members 25, and a quadrangular flat plate-shaped bottom table 26 is disposed on the bottom plates 25b located at the four positions.

As drive means for causing the two eccentric weight rotors 6, 7 to synchronously rotate, a motor 14, middle timing pulleys 15, 16, a large timing pulley 18, small timing pulleys 19a, 19b, and timing belts 21, 22 are included. If the motor 14 is activated, a rotation force thereof is output to a rotation shaft 14a via a gear box 17.

The middle timing pulley 15 is attached to the rotation shaft 14a rotated by the motor 14, and the middle timing pulley 16 and the large timing pulley 18 are rotatably attached to the principal shaft 1 via a bearing. The rotation shaft 14a is parallel with the principal shaft 1, the middle timing pulley 15 on the side of the motor 14 is located immediately below the middle timing pulley 16 on the side of the principal shaft 1, and the middle timing pulleys 15, 16 are disposed to face each other in series in the up-down direction.

The small timing pulleys 19a, 19b are attached to the shaft bodies 4, 5. The small timing pulleys 19a, 19b are disposed in series with the large timing pulley 18 interposed therebetween. The small timing pulleys 19a, 19b have mutually the same sizes (outer diameters), and the middle timing pulleys 15, 16 also have mutually the same sizes (outer diameters).

The middle timing pulley 15 and the middle timing pulley 16 are interlocked by a timing belt 21, and the small timing pulleys 19a, 19b and the large timing pulley 18 are interlocked by a timing belt 22.

If the motor 14 is activated, the middle timing pulley 15 attached integrally to the rotation shaft 14a rotates, the rotation of the middle timing pulley 15 is transmitted to the middle timing pulley 16 via the timing belt 21, and the middle timing pulley 16 thus rotates in the same direction at the same rotation frequency as those of the rotation shaft 14a. The rotation of the middle timing pulley 16 is transmitted to the large timing pulley 18 integrated with the middle timing pulley 15 via the principal shaft 1.

Since the rotation of the large timing pulley 18 is transmitted to the small timing pulleys 19a, 19b via the timing belt 22, the shaft bodies 4, 5 to which the small timing pulleys 19a, 19b are attached, respectively rotate in mutually the same direction at the same rotation frequency. Therefore, the two eccentric weight rotors 6, 7 mutually synchronously rotate in the same direction at the same rotation frequency. Also, although the link mechanisms 34, 35 and the sliders 31, 32 also integrally rotate with the rotation of the two eccentric weight rotors 6, 7, the slider 30 and the interlocking member 33 are held in a stationary state. Note that in the repeated moment generation device 100, rotational center lines of the two eccentric weight rotors 6, 7 are the same as the shaft centers 4c, 5c of the shaft bodies 4, 5, respectively.

In the repeated moment generation device 100 illustrated in FIGS. 8 to 10, the two eccentric weight rotors 6, 7 are disposed such that eccentricity directions of the centers of gravity of the eccentric weight members 6c, 7c (the directions of the centrifugal forces 6a, 7a) are different from each other by 180 degrees around the shaft centers 4c, 5c of the shaft bodies 4, 5 thereof. Therefore, the two eccentric weight rotors 6, 7 rotate while maintaining a relationship in which the directions of the centrifugal forces 6a, 7a thereof are different from each other by 180 degrees around the rotational center lines (shaft centers 4c, 5c).

If the eccentric weight rotors 6, 7 rotate with rotation of the shaft bodies 4, 5 that is rotated by a drive force of the motor 14 as will be described later in a state in which the centers of gravity of the eccentric weight members 6c, 7c are decentered from the shaft centers 4c, 5c, then the eccentric weight members 6c, 7c also rotate about the shaft centers 4c, 5c, and centrifugal forces 6a, 7a with the magnitudes determined by the amounts of eccentricity of the centers of gravity of the eccentric weight members 6c, 7c and the rotation frequencies are generated in the shaft center directions of the main body portions 6e, 7e. Since the directions in which the centrifugal forces 6a, 7a act rotate about the shaft centers 4c, 5c, the directions of the centrifugal forces 6a, 7a change in the up-down left-right directions with the rotation.

Since vibration is generated by the two eccentric weight rotors 6, 7 rotating about the rotational center lines (shaft centers 4c, 5c), respectively, and the vibration alternately vibrate both end portions of the lever members 3a, 3b in the up-down direction via the shaft bodies 4, 5 in this manner, the lever members 3a, 3b repeat minute seesaw movement around the shaft center 1c of the principal shaft 1, and the principal shaft 1 integrated with the lever members 3a, 3b thus repeats minute forward/reverse rotation. Therefore, if a test piece (not illustrated) is set on an extension of the shaft center 1c of the principal shaft 1, it is possible to impart a repeated load (repeated moment) on the test piece.

As described above, if the handle 44 is rotated in the arrow W1 direction, then the sliders 30, 31, 32 slide in a direction away from the lever member 3b, the stoppers 6g, 7g move in directions away from the diameter expanded portions 6b, 7b of the shaft bodies 6, 7 via the link mechanisms 34, 35, the centers of gravity of the eccentric weight members 6c, 7c are separated from the shaft centers 4c, 5c of the shaft bodies 4, 5, respectively, vibration generated through rotation of the eccentric weight rotors 6, 7 thus increases, and the amplitude of the repeated moment imparted on the principal shaft 1 via the lever members 3a, 3b increases.

On the other hand, if the handle 44 is rotated in a direction opposite to the arrow W1 after the operation of rotating the handle 44 in the arrow W1 direction is performed as described above, then the male screw member 37 rotates in the direction opposite to the arrow W2 via the worm gear 40a and the helical gear 39, the sliders 30, 31, 32 move in a direction approaching the lever member 3b, the stoppers 6g, 7g move in directions approaching the diameter expanded portions 6b, 7b of the shaft bodies 6, 7, respectively, the centers of gravity of the eccentric weight members 6c, 7c approach the shaft centers 4c, 5c of the shaft bodies 4, 5, respectively on a manner opposite to that described above, the vibration generated through the rotation of the eccentric weight rotors 6, 7 thus decreases, and the amplitude of the repeated moment imparted on the principal shaft 1 via the lever members 3a, 3b decreases.

In this manner, it is possible to increase and decrease the amplitude (adjust the amplitude) of the repeated moment imparted to the principal shaft 1 via the lever members 3a, 3b by performing an operation of rotating the handle 44 in the arrow W1 direction or the opposite direction. Such an action for adjusting the amplitude can also be performed not only when the two eccentric weight rotors 6, 7 are stopped but also when they are rotating.

Also, it is possible to set an optimal amplitude by setting the centers of gravity of the eccentric weight members 6c, 7c of the two eccentric weight rotors 6, 7 at the positions (the amplitude zero positions) of the rotational center lines (shaft centers 4c, 5c) thereof when the motor 14 is stopped, then starting the motor 14, and operating the handle 44 when the two eccentric weight rotors 6, 7 are rotating to gradually increase the amplitude, and it is thus possible to avoid so-called overshoot.

Furthermore, if a torsional moment meter and a rotation angle encoder are used together with the repeated moment generation device 100, it is also possible to perform closed loop control, to perform testing based not only on torsional moment control but also on angular displacement control and program control, and to include various control functions that are comparable with an advanced hydraulic fatigue testing machine at low cost.

Note that although the repeated moment generation device 100 illustrated in FIGS. 8 to 10 include two shaft bodies 4, 5, two eccentric weight rotors 6, 7, two sliders 31, 32, and two link mechanisms 34, 35 for one principal shaft 1, and each component is provided with an amplitude adjustment mechanism, the repeated moment generation device 100 is not limited thereto and can include one shaft body 4 (or 5), one eccentric weight rotor 6 (or 7), one slider 31 (or 32), and one link mechanism 34 (or 35) for one principal shaft 1, and it is possible to obtain an amplitude adjustment function that is similar to that described above in this case as well.

Next, the repeated moment generation device 200 according to another embodiment will be described on the basis of FIG. 11. Note that the same reference signs as the reference signs in FIGS. 8 to 10 are applied to parts (members) that are common to those in the repeated moment generation device 100 illustrated in FIGS. 8 to 10 from among the parts (members) configuring the repeated moment generation device 200 illustrated in FIG. 11, and description thereof will be omitted.

Figure 11:
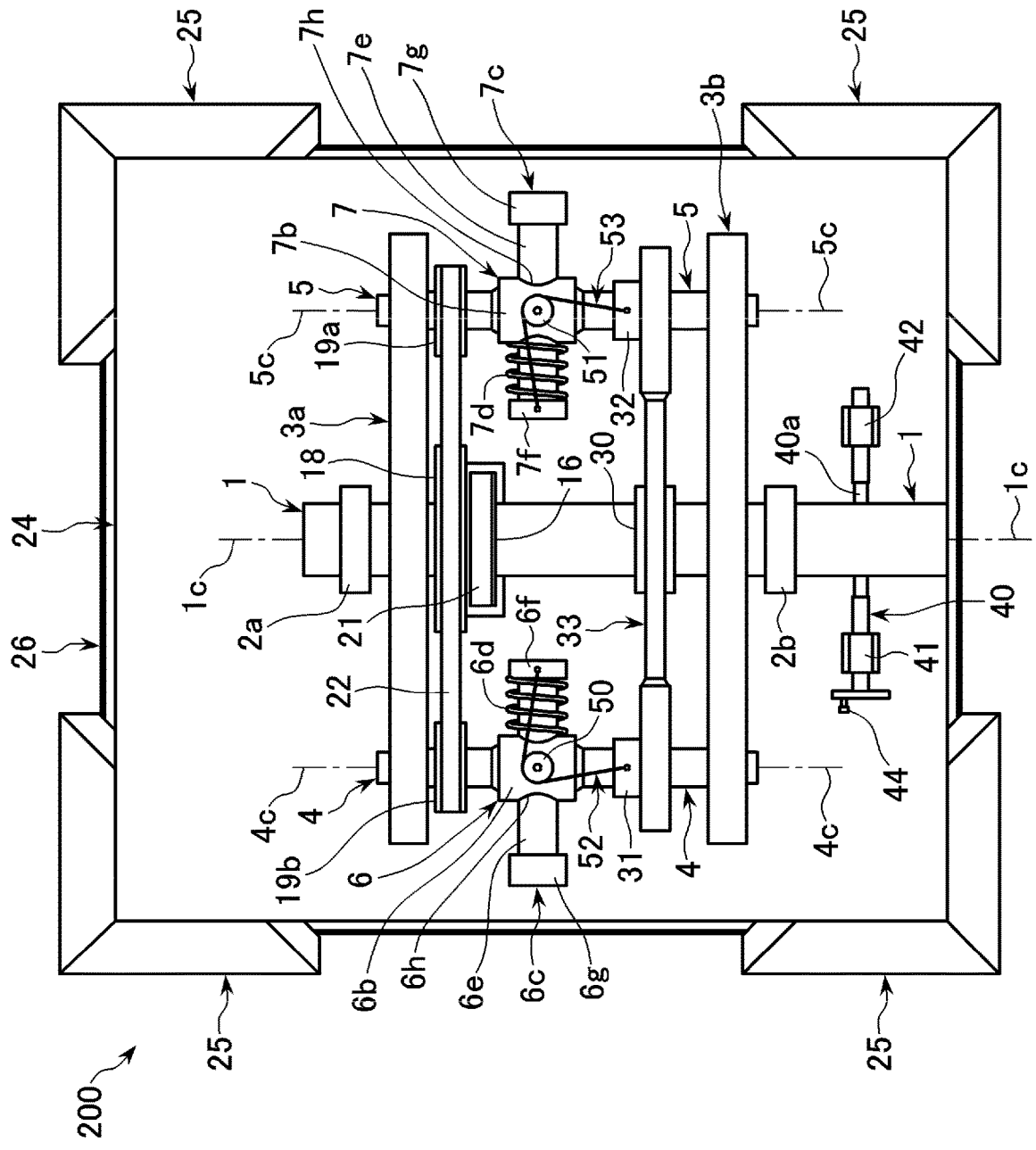
FIG. 11 is a partially omitted plan view illustrating a repeated moment generation device according to another embodiment.

As illustrated in FIG. 11, pulleys 50, 51 and wires 52, 53 are provided instead of the link mechanisms 34, 35 illustrated in FIG. 10, as joining means for converting sliding motion of sliders 31, 32 in the directions of shaft centers 4c, 5c of shaft bodies 4, 5 into sliding motions of eccentric weight members 6c, 7c in directions that are orthogonal to the shaft bodies 4, 5 and transmitting the sliding motion to the eccentric weight members 6c, 7c in the repeated moment generation device 200. Note that the wires 52, 53 are not limited thereto, and flexible wire materials, string-shaped materials, chains, or the like may also be used as long as they have a similar function.

As illustrated in FIG. 11, the pulleys 50, 51 are rotatably and axially supported by diameter expanded portions 6b, 7b of eccentric weight rotors 6, 7, and the sliders 31 (32) and the eccentric weight members 6c (7c) are coupled with the wires 52 (53) via the pulleys 50 (51). End portions of the wires 52 (53) on one side are locked by the sliders 31 (32), and the other ends of the wires 52 (53) are locked by the stoppers 6f (7f) of the eccentric weight members 6c (7c).

If the handle 44 is rotated in a direction opposite to the arrow W1 illustrated in FIG. 9, then the sliders 31, 32 move along with an interlocking member 33 in a direction approaching the lever member 3b, the stoppers 6f (7f) of the eccentric weight members 6c (7c) thus slide in the directions approaching the diameter expanded portions 6b (7b) via the wires 52 (53) and the pulleys 50 (51), the centers of gravity of the eccentric weight members 6c (7c) are separated from the shaft centers 4c (5c) of the shaft bodies 4 (5), vibration generated through rotation of the eccentric weight rotors 6, 7 thus increases, and the amplitude of the repeated moment imparted on the principal shaft 1 via the lever members 3a, 3b increases.

On the other hand, if the handle 44 is caused to rotate in the arrow W1 direction after the operation of rotating the handle 44 in the direction opposite to the arrow W1 is performed as described above, then the sliders 30, 31, 32 move in a direction away from the lever member 3b, the stoppers 6g, 7g move in the direction toward the diameter expanded portions 6b, 7b of the eccentric weight rotors 6, 7, respectively, in the manner opposite to that described above, centers of gravity of the eccentric weight members 6c, 7c approaches the diameter expanded portions 6b, 7b of the eccentric weight rotors 6, 7 (the shaft centers 4c, 5c of the shaft bodies 4, 5) due to elastic restoring forces of the springs 6d, 7d, respectively, vibration generated through rotation of the eccentric weight rotors 6, 7 thus decreases, and the amplitude of the repeated moment imparted to the principal shaft 1 decreases via the lever members 3a, 3b.

In this manner, it is possible to adjust the amplitude of the repeated moment imparted on the principal shaft 1 by performing the operation of rotating the handle 44 regardless of whether the eccentric weight rotors 6, 7 are rotating even in the repeated moment generation device 200 as well. Structures, functions, effects and advantages, and the like of the other parts are similar to those of the aforementioned repeated moment generation device 100.

Next, a forward/reverse micromotion rotational elastic bearing 50, a repeated moment generation device 100 using the same, and forward/reverse micromotion rotational elastic bearings 60, 70, 80, 90 according to other embodiments will be described on the basis of FIGS. 12 to 25. Note that some of components are expressed in a transparent manner in order to enhance visibility in FIG. 16. The reference signs described in the explanation in the paragraphs [0093] to [0134] correspond only to the reference signs described in the drawings [FIG. 12] to [FIG. 25], respectively, and do not correspond to the reference signs described in the drawings other than the drawings [FIG. 12] to [FIG. 25].

First, the forward/reverse micromotion rotational elastic bearing 50 and a repeated moment generation device 100 using the forward/reverse micromotion rotational elastic bearing 50 will be described on the basis of FIGS. 12 to 17.

First, a structure, functions, and the like of the forward/reverse micromotion rotational elastic bearing 50 will be described on the basis of FIGS. 12 to 15. As illustrated in FIGS. 12 to 15, the forward/reverse micromotion rotational elastic bearing 50 includes support members 51, 52 that are disposed in the surroundings of a shaft body 1 that minutely rotate in forward/reverse directions, and a plurality of plate-shaped elastic members 53, 54 that are locked at the support members 51, 52 on the side of proximal end portions 53b, 54b thereof and are locked at the outer circumference of the shaft body 1 on the side of distal end portions 53a, 54a thereof, and the side of the proximal end portions 53b (54b) and the side of the distal end portion 53a (54a) of the plate-shaped elastic members 53, 54 are locked at positions facing each other with the shaft body 1 interposed therebetween.

The plurality of plate-shaped elastic members 53, 54 are plate-shaped elastic members with the same shape and the same dimension, and the side of the proximal end portions 53b (54b) and the side of the distal end portions 53a (54a) of the plurality of plate-shaped elastic members 53, 54 are locked at positions at which the plate-shaped elastic members 53, 54 are axially symmetrically deformable in relation to a shaft center 1c of the shaft body 1 when a torsional moment is imparted on the shaft body 1.

Figure 13:
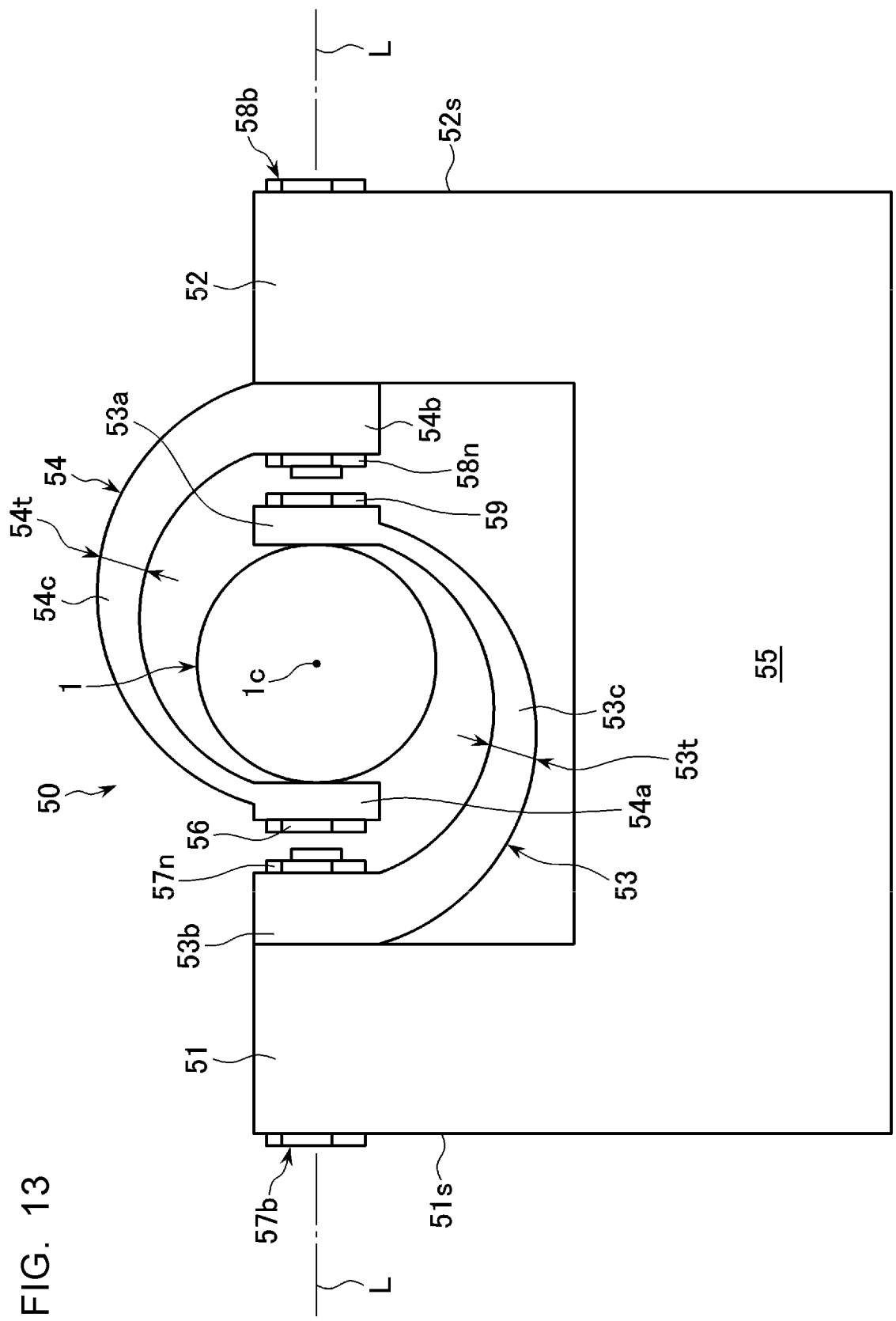
FIG. 13 is a partially omitted front view of the forward/reverse micromotion rotational elastic bearing seen from the arrow A direction in FIG. 12.
Figure 14:
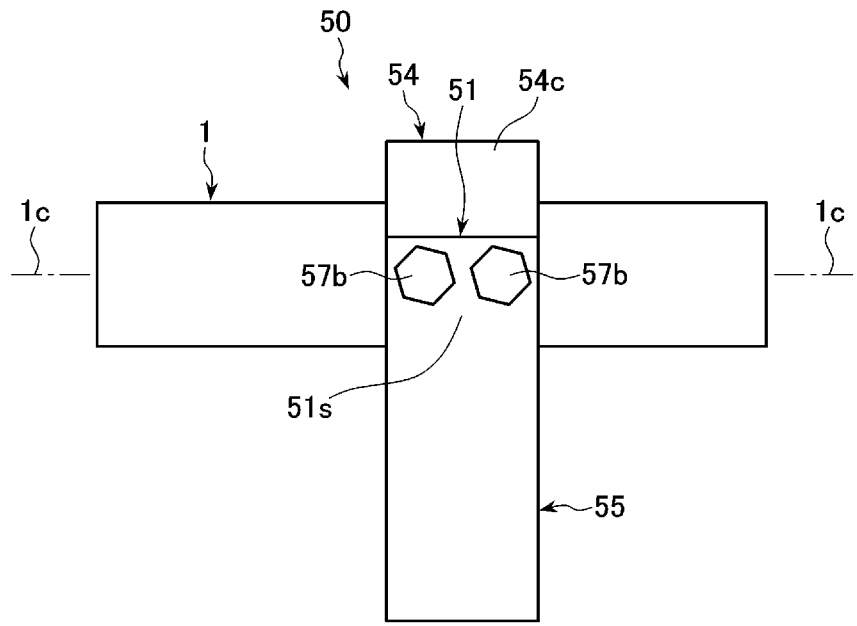
FIG. 14 is a partially omitted side view of the forward/reverse micromotion rotational elastic bearing seen from the arrow B direction in FIG. 12.
Figure 15:
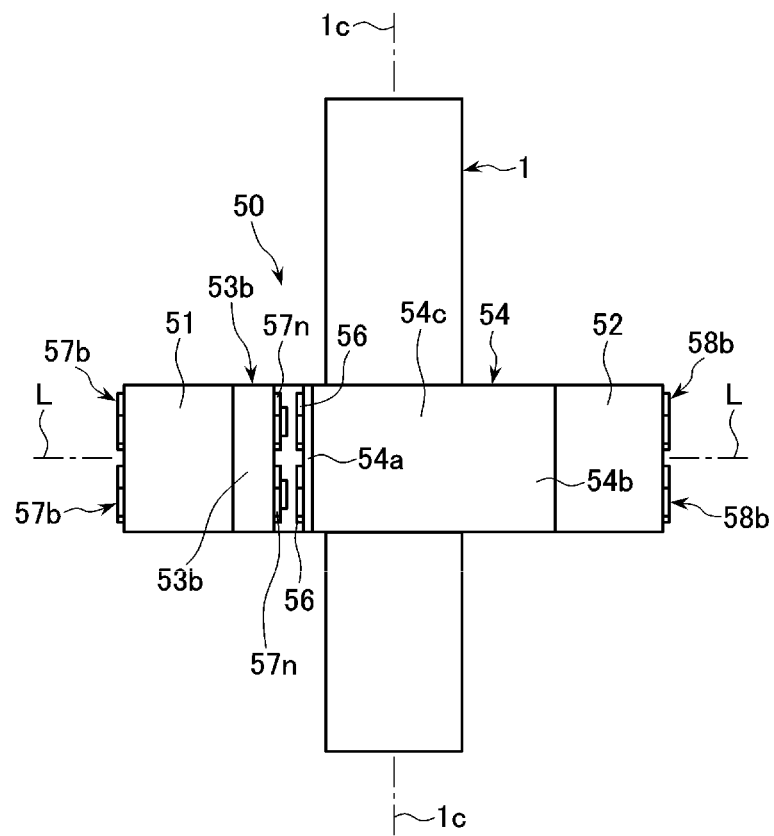
FIG. 15 is a partially omitted plan view of the forward/reverse micromotion rotational elastic bearing seen from the arrow C direction in FIG. 12.

The support members 51, 52 are integrally provided to stand on a block body 55, and the support members 51, 52 and the block body 55 have a recessed front-view shape as illustrated in FIG. 13. As illustrated in FIG. 13, the support members 51, 52 include parts that are mirror-symmetrical with the shaft body 1 interposed therebetween. The support members 51, 52 are disposed at positions at which the plate-shaped elastic members 53, 54 are axially symmetrically deformable in relation to the shaft center 1c of the shaft body 1 when a torsional moment is imparted on the shaft body 1.

As described above, the plate-shaped elastic members 53, 54 are plate-shaped elastic members with the same shape and the same dimension and include curved portions 53c, 54c curved to surround a semi-perimeter region of the surrounding of the shaft body 1. Plate thicknesses 53t, 54t of the plate-shaped elastic members 53, 54 successively decrease from the proximal end portions 53b, 54b toward the distal end portions 53a, 54a of the plate-shaped elastic members 53, 54.

The proximal end portion 53b of the plate-shaped elastic member 53 is fixed to the support member 51 with a bolt 57b that penetrates through the support member 51 and the proximal end portion 53b from a left side surface 51s of the support member 51 toward the shaft body 1 and a nut 57n screwed onto the bolt 57b. Similarly, the proximal end portion 54b of the plate-shaped elastic member 54 is fixed to the support member 52 with a bolt 58b that penetrates through the support member 52 and the proximal end portion 54b from a right side surface 52s of the support member 52 toward the shaft body 1 and a nut 58n screwed on to the bolt 58b.

Figure 12:
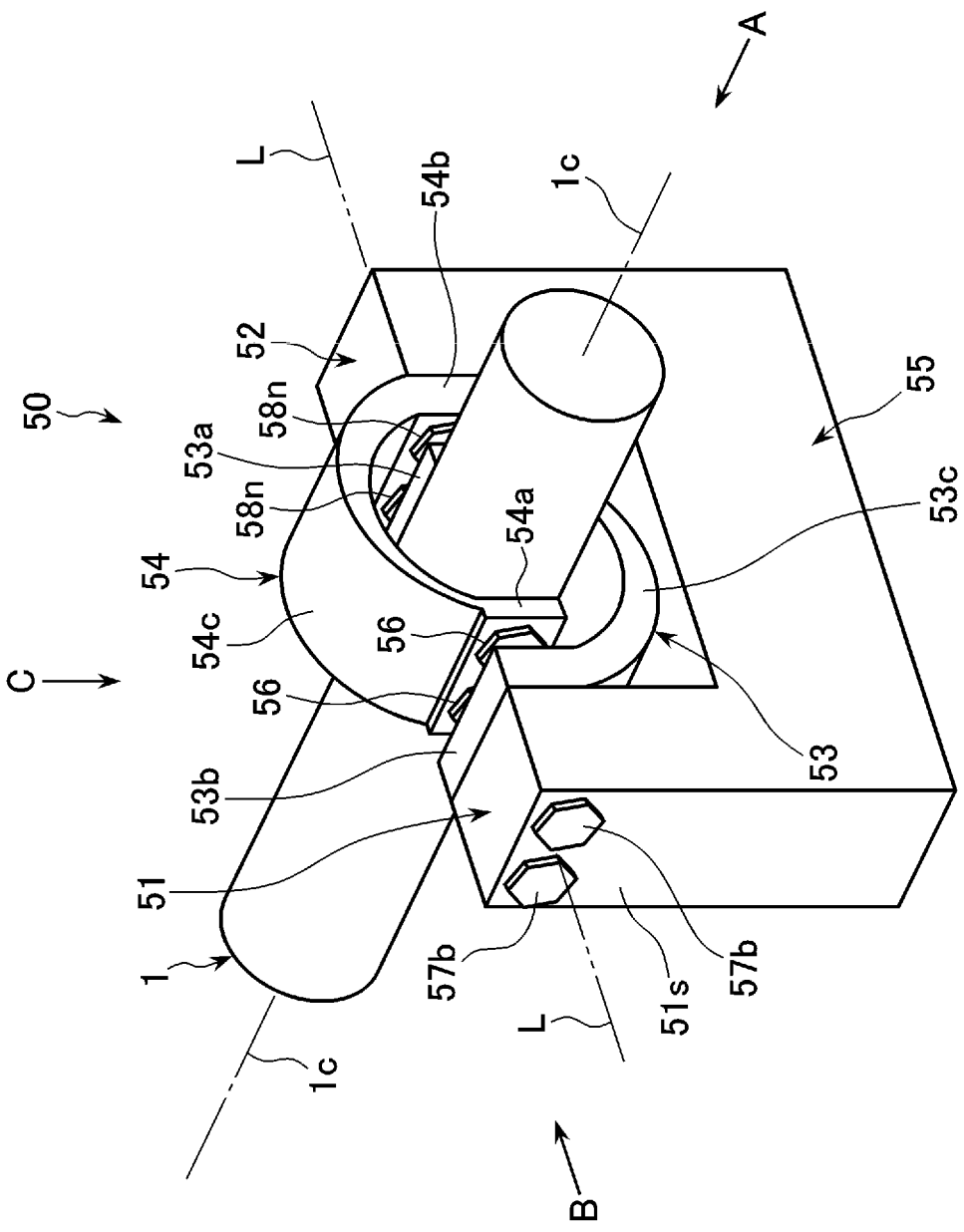
FIG. 12 is a partially omitted perspective view illustrating a forward/reverse micromotion rotational elastic bearing used in a repeated moment generation device illustrated in FIG. 16.

The distal end portion 53a of the plate-shaped elastic member 53 is fixed to an outer circumferential surface of the shaft body 1 with a bolt 59, and the distal end portion 54a of the plate-shaped elastic member 54 is fixed to the outer circumferential surface of the shaft body 1 with a bolt 56. As illustrated in FIGS. 12 and 13, the proximal end portion 53b and the distal end portion 53a of the plate-shaped elastic member 53, which is one of the plate-shaped elastic members, and the proximal end portion 54b and the distal end portion 54a of the other plate-shaped elastic member 54 are disposed in series on a virtual straight line L that is orthogonal to the shaft center 1c of the shaft body 1.

Since the shaft body 1 is supported by the pair of plate-shaped elastic members 53, 54 disposed to face each other with the shaft body 1 interposed therebetween in the forward/reverse micromotion rotational elastic bearing 50, it is possible not only to stably support the shaft body 1 that minutely rotates in the forward/reverse directions at a constant position, but also to apply a rotation angle that is proportional to the magnitude of the torsional moment imparted on the shaft body 1 to the shaft body 1, and to apply a restoring force of restoring the shaft body 1 to a specific position at which the rotation angle becomes zero against the torsional moment.

Also, since there are no parts that come into contact with each other, or are separated from each other, slide in a minute region in the forward/reverse micromotion rotational elastic bearing 50 that supports the shaft body 1 that minutely rotate in the forward/reverse direction, noise and vibration during the operation are significantly small, it is not necessary to perform maintenance, the number of components of the forward/reverse micromotion rotational elastic bearing 50 is small, and it is thus possible to relatively easily realize simplification, size reduction, and weight reduction of the structure.

Next, the repeated moment generation device 100 using the forward/reverse micromotion rotational elastic bearing 50 illustrated in FIGS. 12 to 15 will be described on the basis of FIGS. 16 and 17. Note that some of components (for example, a table 24, support legs 25, and the like) are displayed in a transparent manner in order to enhance visibility in FIGS. 16 and 17.

Figure 16:
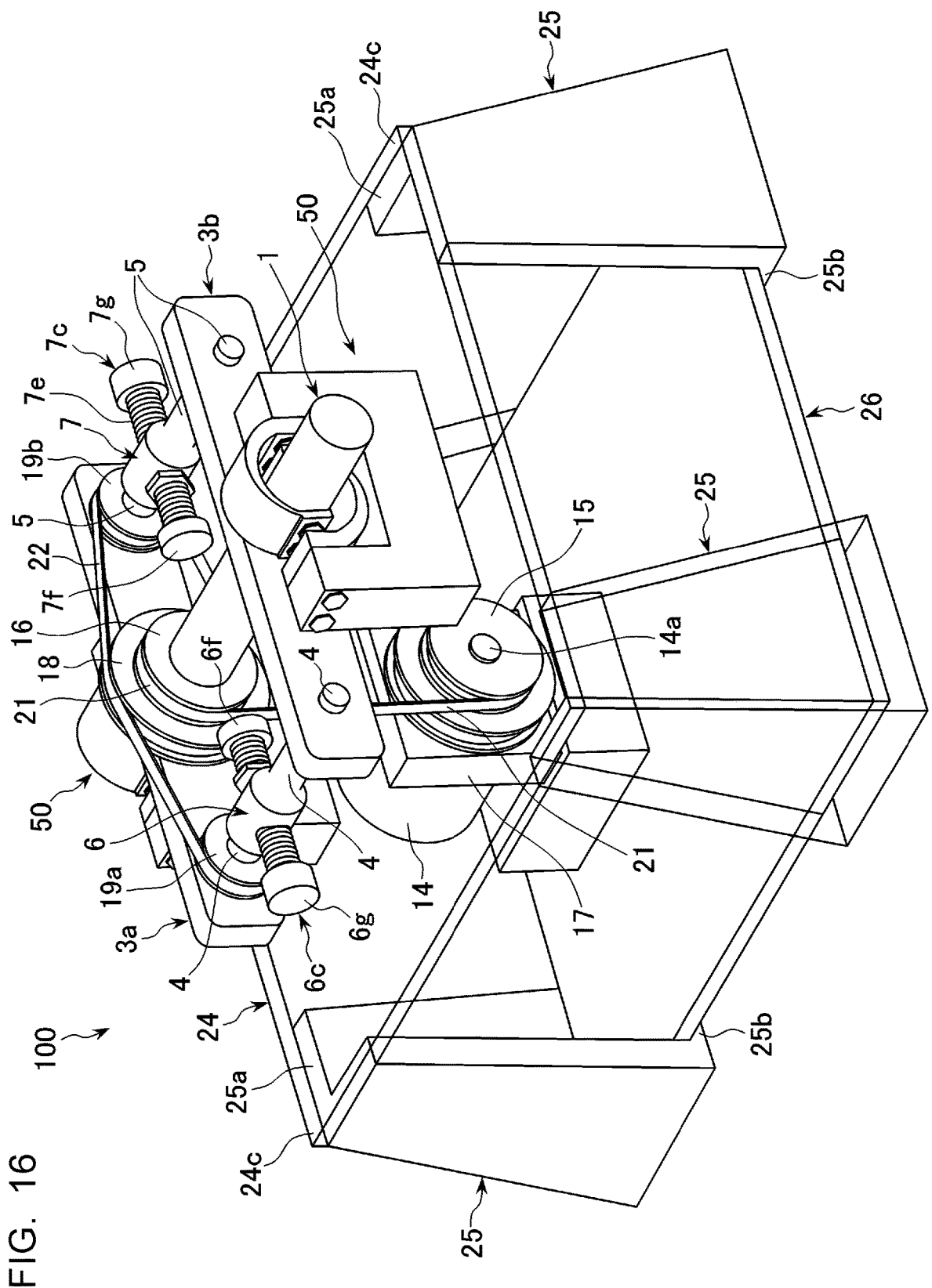
FIG. 16 is a partially omitted perspective view of the repeated moment generation device using the forward/reverse micromotion rotational elastic bearing illustrated in FIG. 12.
Figure 17:
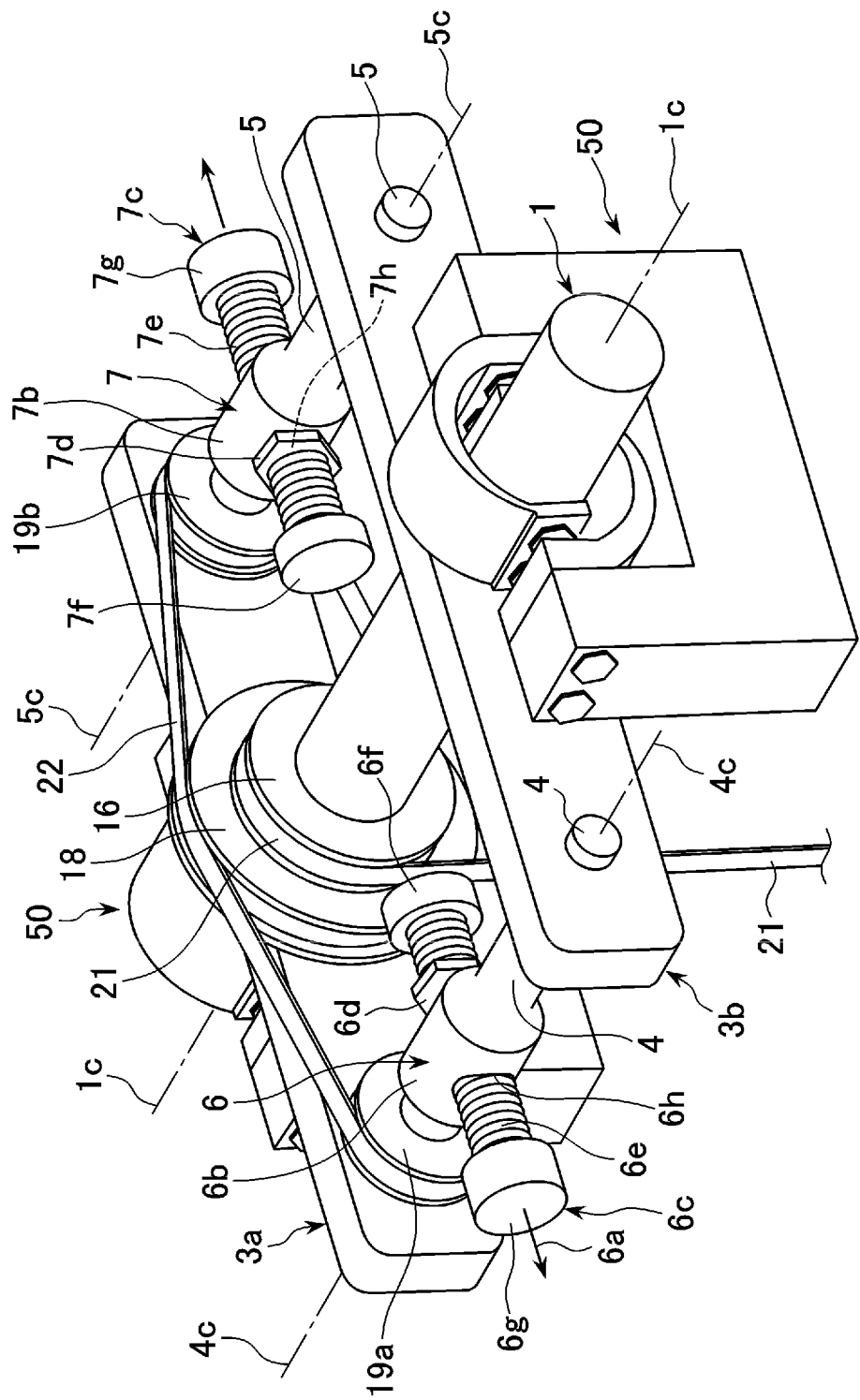
FIG. 17 is a partially enlarged view of the repeated moment generation device illustrated in FIG. 16.

As illustrated in FIGS. 16 and 17, the repeated moment generation device 100 can be used for a fatigue testing machine (not illustrated) that imparts a repeated moment on a test piece to test a fatigue strength property. Since the shaft body 1 that transmits a repeated moment to the test piece (not illustrated) set in the fatigue testing machine is held such that it is minutely rotatable in the forward/reverse directions in the repeated moment generation device 100, forward/reverse micromotion rotational elastic bearings 50, 50 are disposed at parts near both ends of the shaft body 1, respectively. The forward/reverse micromotion rotational elastic bearings 50, 50 are disposed on the upper surface of the table 24 at a predetermined distance therebetween in the direction of the shaft center 1c of the shaft body 1.

The pair of lever members 3a, 3b are attached to the shaft body 1 in a state in which each of the lever members 3a, 3b intersects the shaft body 1, at positions separated from each other in the direction of the shaft center 1c of the shaft body 1 in a region between the forward/reverse micromotion rotational elastic bearings 50, 50, shaft bodies 4, 5 that is rotatable about shaft centers 4c, 5c that are parallel to the shaft body 1 are provided at symmetrical positions with the shaft body 1 interposed therebetween in a region where the lever members 3a, 3b face each other, and the eccentric weight rotors 6, 7 that rotate along with the shaft bodies 4, 5 about the shaft centers 4c, 5c are provided at parts of the shaft bodies 4, 5.

As illustrated in FIG. 17, the eccentric rotors 6, 7 include diameter expanded portions 6b, 7b provided at parts of the shaft bodies 4, 5, respectively, and eccentric weight members 6c, 7c that are inserted into penetrating female screw holes 6h, 7h opening in the diameter expanded portions 6b, 7b in a direction that is orthogonal to the shaft centers 4c, 5c in a state in which the eccentric weight members 6c, 7c perpendicularly intersect the shaft bodies 4, 5 and are movable along a direction that is orthogonal to the shaft bodies 4, 5.

The eccentric weight members 6c, 7c include bolt members 6e, 7e that are screwed to penetrate through the diameter expanded portions 6b, 7b, weights 6g, 7g that are provided at end portions of the bolt members 6e, 7e on one side, and locking nuts 6d, 7d that are screwed onto the bolt members 6e, 7e to lock the bolt members 6e, 7e at the diameter expanded portions 6b, 7b. Male screws are formed on the outer circumferences of the bolt members 6e, 7e, and short cylinder-shaped stopper portions 6f, 7f with diameters increased as compared with the male screw portions are provided at the other end portions of the eccentric weight members 6c, 7c. Also, a motor 14 that is drive means for causing the shaft bodies 4, 5 to synchronously rotate is included.

The bolt members 6e, 7e that include the male screws on the outer circumferences are screwed in a state in which the bolt members 6e, 7e penetrate through the diameter expanded portions 6b, 7b with female screw holes 6h, 7h, and it is possible to change the positions of centers of gravity (not illustrated) of the eccentric weight members 6c, 7c to be separated from the shaft centers 4c, 5c or to approach the shaft centers 4c, 5c by causing the bolt members 6e, 7e to rotate about the shaft centers thereof and move in the longitudinal direction and by changing the distance between the weights 6g, 7g and the shaft centers 4c, 5c of the shaft bodies 4, 5.

As illustrated in FIG. 16, the table 24 is a quadrangular flat plate-shaped member and is maintained in a horizontal state by four support legs 25 that are disposed on the side of lower surfaces of four corner portions 24c thereof. The support legs 25 have L-shaped horizontal sections and are provided with bottom plates 25b on the side of the lower surfaces. Each of the four corner portions 24c of the table 24 is fixed in a state in which the corner portions 24c are placed on upper surfaces 25a of the four support legs 25, and a quadrangular flat plate-shaped bottom table 26 is disposed on the bottom plate 25b located at the four positions.

The motor 14, middle timing pulleys 15, 16, a large timing pulley 18, small timing pulleys 19a, 19b, and timing belts 21, 22 are provided as drive means for causing the two eccentric weight rotors 6, 7 to synchronously rotate, on the bottom table 26 below the table 24. If the motor 14 is activated, a rotation force thereof is output to a rotation shaft 14a via a gear box The middle timing pulley 15 is attached to the rotation shaft 14a rotated by the motor 14, and the middle timing pulley 16 and the large timing pulley 18 are rotatably attached to the shaft body 1 via a bearing. The rotation shaft 14a is parallel with the shaft body 1, and the middle timing pulley 15 on the side of the motor 14 is located immediately below the middle timing pulley 16 on the side of the shaft body 1, such that the middle timing pulleys 15, 16 are disposed to face each other in series in the up-down direction.

The small timing pulleys 19a, 19b are attached to the shaft bodies 4, 5. The small timing pulleys 19a, 19b are disposed in series with the large timing pulley 18 interposed therebetween. The sizes (outer diameters) of the small timing pulleys 19a, 19b are mutually the same, and the sizes (outer diameters) of the middle timing pulleys 15, 16 are also mutually the same.

The middle timing pulley 15 and the middle timing pulley 16 are interlocked by the timing belt 21, and the small timing pulleys 19a, 19b and the large timing pulley 18 are interlocked by the timing belt 22.

If the motor 14 is activated, then the middle timing pulley 15 attached integrally to the rotation shaft 14a rotates, the rotation of the middle timing pulley 15 is transmitted to the middle timing pulley 16 via the timing belt 21, and the middle timing pulley 16 thus rotates in the same direction at the same rotation frequency as those of the rotation shaft 14a. The rotation of the middle timing pulley 16 is transmitted to the large timing pulley 18 integrated with the middle timing pulley 15 via the shaft body 1.

Since the rotation of the large timing pulley 18 is transmitted to the small timing pulleys 19a, 19b via the timing belt 22, the shaft bodies 4, 5 to which the small timing pulleys 19a, 19b are attached, respectively, rotate in mutually the same direction at the same rotation frequency, and thus, the two eccentric weight rotors 6, 7 also mutually synchronously rotate in the same direction at the same rotation frequency. Note that the rotational center lines of the two eccentric weight rotors 6, 7 are the same as the shaft centers 4c, 5c of the shaft bodies 4, 5, respectively, in the repeated moment generation device 100.

In the repeated moment generation device 100 illustrated in FIG. 16, the two eccentric weight rotors 6, 7 are disposed such that eccentricity directions of centers of gravity of the weight members 6c, 7c thereof (the directions of the centrifugal forces 6a, 7a illustrated in FIG. 17) are different from each other by 180 degrees around the shaft centers 4c, 5c of the shaft bodies 4, 5 thereof. Therefore, the two eccentric weight rotors 6, 7 rotate while maintaining the relationship in which the directions of the centrifugal forces 6a, 7a thereof are different from each other by 180 degrees around the rotational center lines (shaft centers 4c, 5c).

If the eccentric weight rotors 6, 7 rotate with rotation of the shaft bodies 4, 5 which is rotated by a drive force of the motor 14 in a state in which the centers of gravity of the eccentric weight members 6c, 7c are decentered from the shaft centers 4c, 5c, then the eccentric weight members 6c, 7c also rotate about the shaft centers 4c, 5c, and the centrifugal forces 6a, 7a with magnitudes determined by the amounts of eccentricity of the centers of gravity and the rotation frequency of the eccentric weight members 6c, 7c are generated in the direction of the shaft centers of the bolt members 6e, 7e. Since directions in which the centrifugal forces 6a, 7a act rotate about the shaft centers 4c, 5c, the directions of the centrifugal forces 6a, 7a change in up-down and left-right directions with the rotation.

In this manner, vibration is generated by the two eccentric weight rotors 6, 7 rotating about the rotational center lines (shaft centers 4c, 5c) thereof, the vibration causes both end portions of the lever members 3a, 3b to alternately vibrate in the up-down direction via the shaft bodies 4, 5, the lever members 3a, 3b thus repeat minute seesaw motion around the shaft center 1c of the shaft body 1, and in this manner, the shaft body 1 integrated with the lever members 3a, 3b repeats minute forward/reverse micromotion rotation. Therefore, if a test piece (not illustrated) is set on an extension of the shaft center 1c of the shaft body 1, it is possible to impart a repeated load (repeated moment) on the test piece.

When the same amount of eccentricity is set for the centers of gravity of the eccentric weight members 6c, 7c in the repeated moment generation device 100, the centrifugal forces 6a, 7a always have the same magnitude, are parallel with each other, and act in the opposite directions, and a repeated couple (moment) of a sine wave is thus generated if the eccentric weight rotors 6, 7 are caused to rotate at a constant rotation frequency. In this manner, the repeated moment is imparted on the test piece (not illustrated) set on the extension of the shaft body 1, and it is thus possible to perform a fatigue test on the test piece.

Also, if the same amount of eccentricity is set for the centers of gravity of the eccentric weight members 6c, 7c, the centrifugal forces 6a, 7a always have the same magnitudes, are parallel with each other, and act in the opposite directions, force components that may cause translational movement are thus always offset regardless of which positions the eccentric weight rotors 6, 7 are located at, and no vibration occurs. In this manner, since only a moment that is axially symmetrical in relation to the shaft center 1c is always transmitted to the shaft body 1 and the forward/reverse micromotion rotational elastic bearing 50 that supports the shaft body, the shaft center 1c of the shaft body 1 is kept with no motion.

Since the pair of plate-shaped elastic members 53, 54 disposed to be symmetrical with the shaft body 1 interposed therebetween support the shaft body 1 in the forward/reverse micromotion rotational elastic bearing 50 that forms a part of the repeated moment generation device 100, it is possible not only to stably support the shaft body 1 that minutely rotates in the forward/reverse directions at a constant position, but also to apply a rotational angle that is proportional to the magnitude of the torsional moment imparted on the shaft body 1 to the shaft body 1, and to apply a restoring force of restoring the shaft body 1 to a specific position at which the rotational angle becomes zero against the torsional moment.

Also, since there are no parts that come into contact with each other, or are separated from each other, slide in a minute region in the forward/reverse micromotion rotational elastic bearing 50 that supports the shaft body 1 that minutely rotate in the forward/reverse direction in the repeated moment generation device 100, noise and vibration during the operation are significantly small, it is not necessary to perform maintenance, the number of components configuring the forward/reverse micromotion rotational elastic bearing 50 is small, and it is thus possible to relatively easily realize simplification, size reduction, and weight reduction of the structure.

Next, forward/reverse micromotion rotational elastic bearings 60, 70, 80, 90 according to other embodiments will be described on the basis of FIGS. 18 to 25. Note that the same reference signs as the reference signs illustrated in FIGS. 12 to 15 are applied to parts that is common to the components of the aforementioned forward/reverse micromotion rotational elastic bearing 50 from among parts that configure the forward/reverse micromotion rotational elastic bearings 60, 70, 80, 90 illustrated in FIGS. 18 to 25, and the description thereof will be omitted in some cases.

Figure 18:
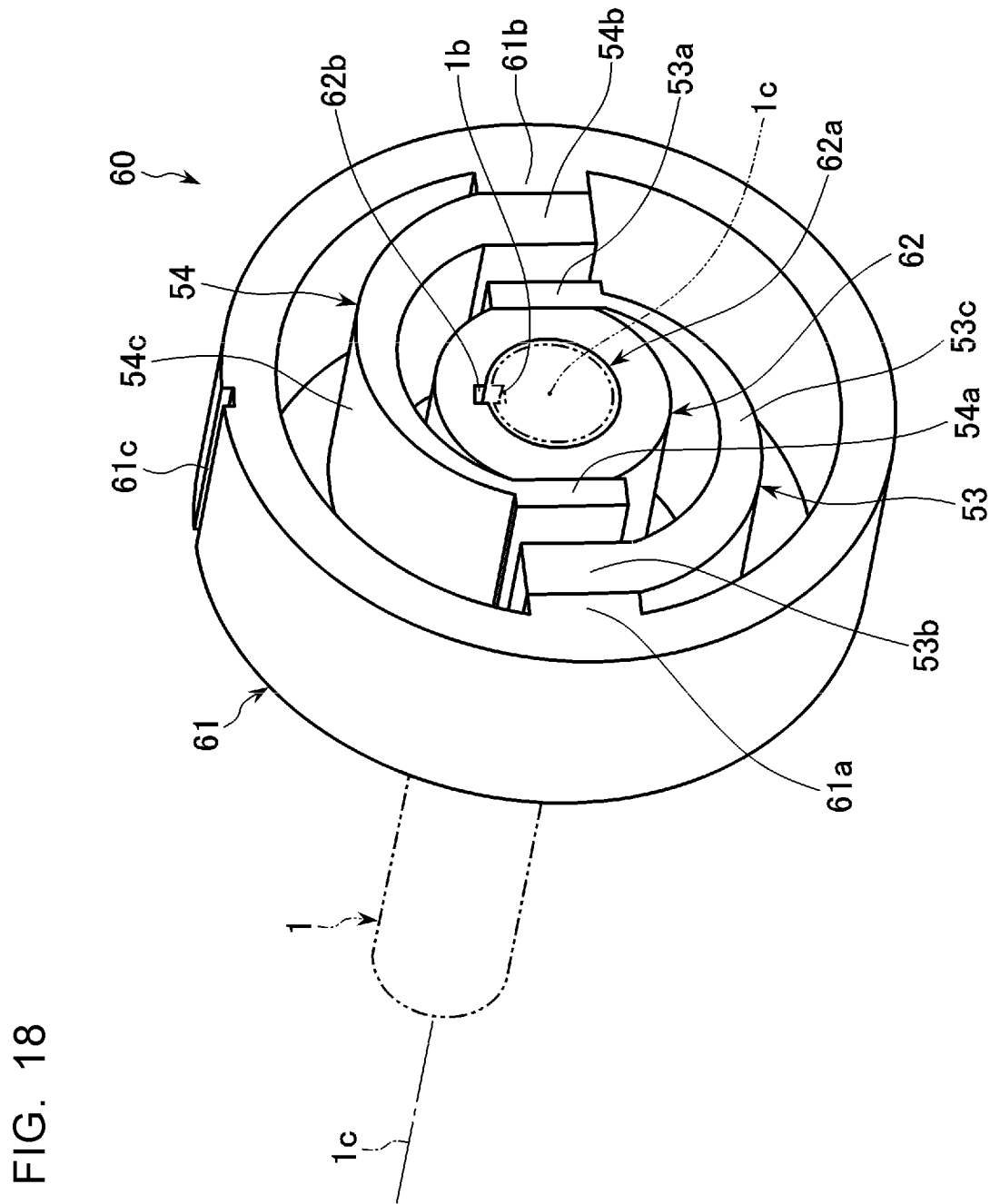
FIG. 18 is a partially omitted perspective view illustrating a forward/reverse micromotion rotational elastic bearing according to another embodiment.
Figure 19:
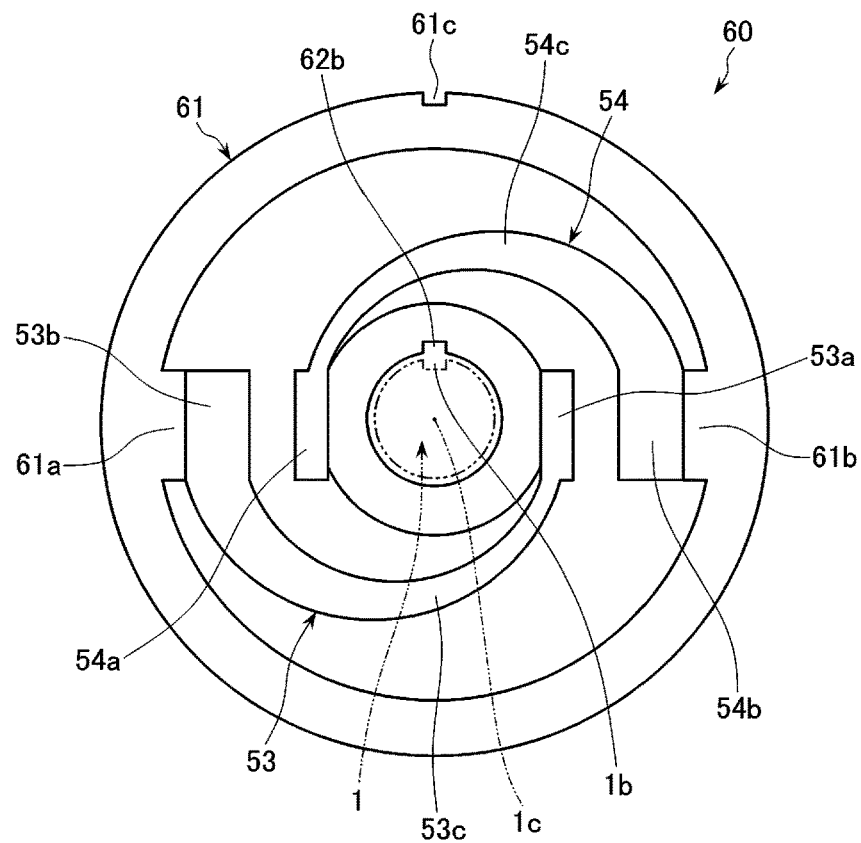
FIG. 19 is a partially omitted front view of the forward/reverse micromotion rotational elastic bearing illustrated in FIG. 18.

The forward/reverse micromotion rotational elastic bearing 60 illustrated in FIGS. 18 and 19 includes a plurality of support portions 61a, 61b that are provided to project from an inner circumferential surface of a short cylinder-shaped support member 61 and plate-shaped elastic members 53, 54 that are locked at support portions 61a, 61b on the side of proximal end portions 53b, 54b thereof and are locked at the outer circumference of a short cylinder-shaped boss 62 that is attachable to and detachable from a shaft body 1 on the side of distal end portions 53a, 54a thereof. The plate-shaped elastic members 53, 54 have the same shape and the same size and are disposed such that a center axis (not illustrated) of the boss 62 coincides with a center axis of the support member 61. If the shaft body 1 is inserted into a through-hole 62a opening in the boss 62, and a key (not illustrated) is put into key grooves 1b, 62b with the positions thereof matched, then the boss 62 and the shaft body 1 are integrally fixed.

Support portions 61a, 61b formed on the inner circumferential surface of the support member 61 at an interval of 180 degrees are mirror-symmetrical with the shaft body 1 (boss 62) interposed therebetween. The side of proximal end portions 53b (54b) and the side of distal end portions 53a (54a) of the plate-shaped elastic members 53, 54 including curved portions 53c, 54c are locked at positions facing each other with the shaft body 1 (boss 62) interposed therebetween.

Since the forward/reverse micromotion rotational elastic bearing 60 includes the boss 62 with the through-hole 62a into and from which the shaft body 1 can be inserted and separated, it is possible to distribute the forward/reverse micromotion rotational elastic bearing 60 as a product of a single item to the market. Also, a key groove 61c is provided at a part of the outer circumferential surface of the support member 61. Although applications, use purposes, and the like of the forward/reverse micromotion rotational elastic bearing 60 are not limited, it is possible to use the forward/reverse micromotion rotational elastic bearing 60 by attaching it to various devices such as a repeated moment generation device, for example, and effects and advantages that are similar to those of the aforementioned forward/reverse micromotion rotational elastic bearing 50 illustrated in FIG. 17 are achieved.

Figure 20:
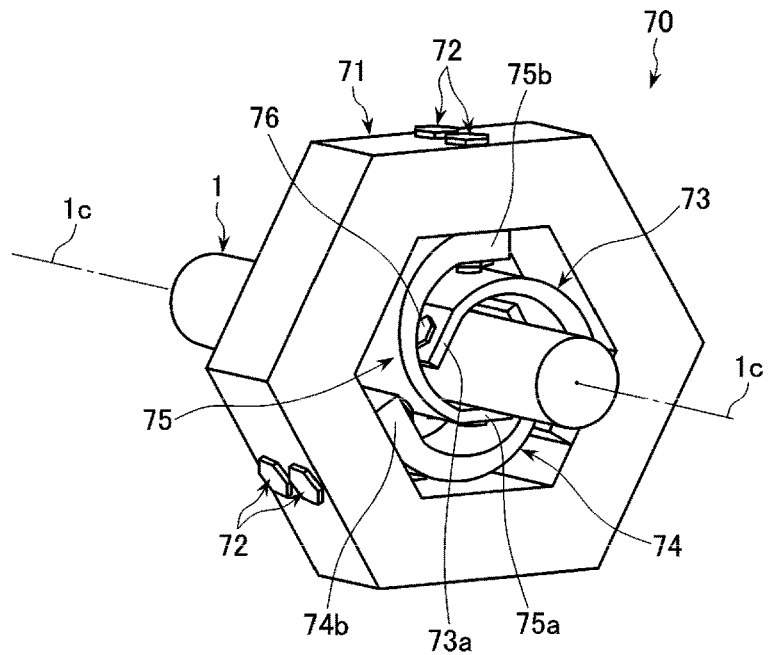
FIG. 20 is a partially omitted perspective view illustrating a forward/reverse micromotion rotational elastic bearing according to another embodiment.
Figure 21:
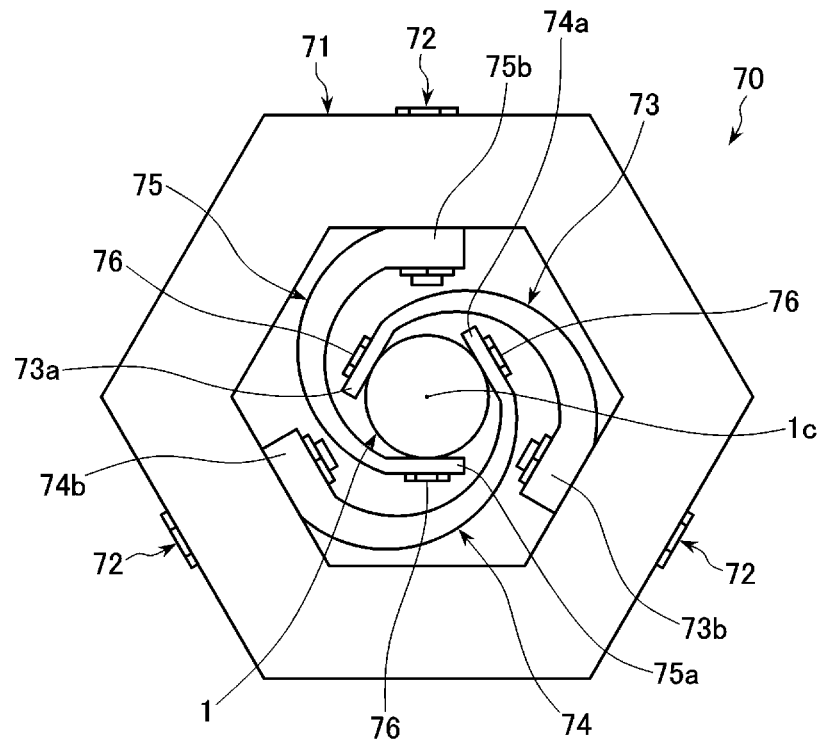
FIG. 21 is a partially omitted front view of the forward/reverse micromotion rotational elastic bearing illustrated in FIG. 20.

Next, in the forward/reverse micromotion rotational elastic bearing 70 illustrated in FIGS. 20 and 21, three plate-shaped elastic members 73, 74, 75 and a shaft body 1 are disposed inside a polygonal (hexagonal) ring-shaped support member 71. The plate-shaped elastic members 73, 74, 75 have the same shape and the same dimension and have a shape and functions that are similar to those of the plate-shaped elastic members 53, 54 illustrated in FIG. 12.

The side of proximal end portions 73b, 74b, 75b of the three plate-shaped elastic members 73, 74, 75 is disposed on the inner circumferential surface of the support member 71 at intervals of 60 degrees around a shaft center 1c of the shaft body 1, and the proximal end portions 73b, 74b, 75b are fixed to the support member 71 with a plurality of bolt nuts 72, respectively. The side of distal end portions 73a, 74a, 75a of the plate-shaped elastic members 73, 74, 75 is disposed on the outer circumferential surface of the shaft body 1 at intervals of 60 degrees around the shaft center 1c, and the distal end portions 73a, 74a, 75a are fixed to the shaft body 1 with a plurality of bolts 76, respectively. The side of the proximal end portions 73b, 74b, 75b and the side of the distal end portions 73a, 74a, 75a of the plate-shaped elastic members 73, 74, 75 are locked at positions facing each other, respectively, with the shaft body 1 interposed therebetween.

Although applications, use purposes, and the like of the forward/reverse micromotion rotational elastic bearing 70 are not limited, it is possible to use the forward/reverse micromotion rotational elastic bearing 70 by attaching it to various devices such as a repeated moment generation device, for example, and effects and advantages that are similar to those of the aforementioned forward/reverse micromotion rotational elastic bearing 50 illustrated in FIG. 12 are achieved. Note that the three plate-shaped elastic members 73, 74, 75 are disposed inside the polygonal (hexagonal) ring-shaped support member 71 in the forward/reverse micromotion rotational elastic bearing 70, the present invention is not limited thereto, and it is also possible to dispose four or more plate-shaped elastic members.

Figure 22:
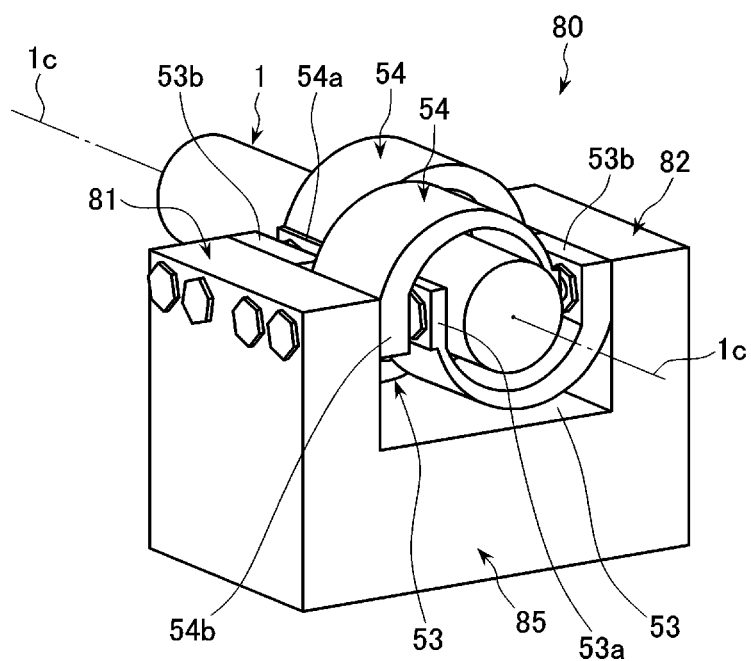
FIG. 22 is a partially omitted perspective view illustrating a forward/reverse micromotion rotational elastic bearing according to another embodiment.
Figure 23:
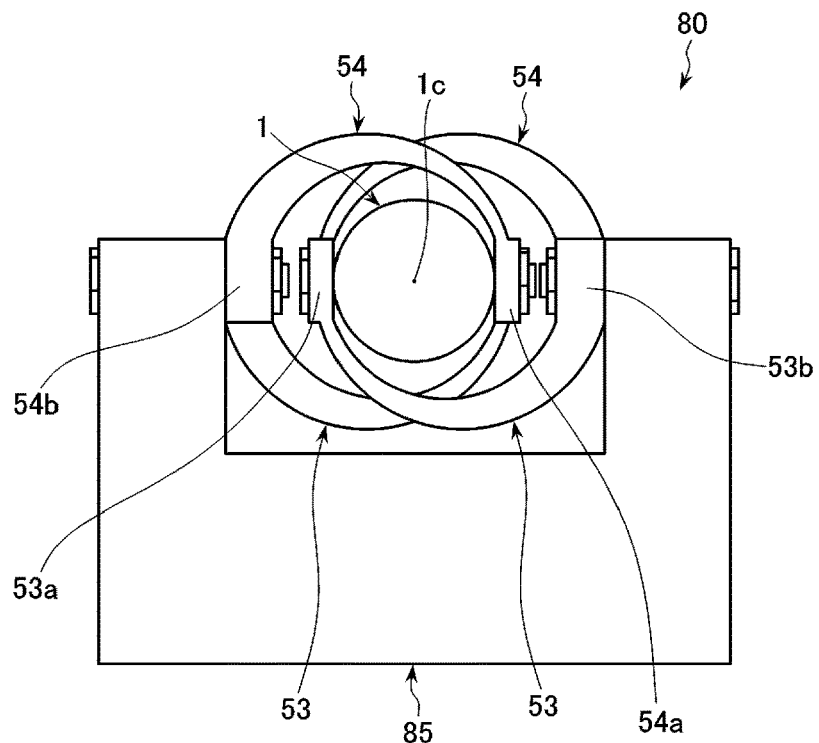
FIG. 23 is a partially omitted front view of the forward/reverse micromotion rotational elastic bearing illustrated in FIG. 22.

Next, the forward/reverse micromotion rotational elastic bearing 80 illustrated in FIGS. 22 and 23 includes support members 81, 82 that are disposed in the surroundings of a shaft body 1 that minutely rotates in the forward/reverse directions and a plurality of plate-shaped elastic members 53, 54 that are locked at the support members 81, 82, respectively, on the side of proximal end portions 53b, 54b thereof and are locked at the outer circumference of the shaft body 1 on the side of distal end portions 53a, 54a thereof, and the side of the proximal end portions 53b, 54b and the side of the distal end portions 53a, 54a of the plate-shaped elastic members 53, 54 are locked at positions facing each other with the shaft body 1 interposed therebetween. The plurality of plate-shaped elastic members 53, 54 are plate-shaped elastic members with the same shape and the same dimension. The support members 81, 82 are provided to stand integrally on a block body 85, and the support members 81, 82 and the block body 85 have a recessed front-view shape as illustrated in FIG. 23.

As illustrated in FIGS. 22 and 23, the forward/reverse micromotion rotational elastic bearing 80 has a function that is similar to that of the two forward/reverse micromotion rotational elastic bearings 50 in FIG. 12 disposed in a horizontally symmetrical manner along the direction of the shaft center of the shaft body 1. It is possible to enhance an elastic force of supporting the shaft body 1 that repeats rotation in the forward/reverse directions at a minute angle by disposing a plurality of plate-shaped elastic members 53, 54 in parallel in this manner. Note that although the shape of the plate-shaped elastic members 53, 54 can be arbitrarily set, the plate thickness and the plate width are not necessarily constant, and it is possible to freely change them from the proximal end portions to the distal end portions, equivalent functions can be achieved if elastic members with the same shape and dimension are disposed at equal intervals.

Figure 24:
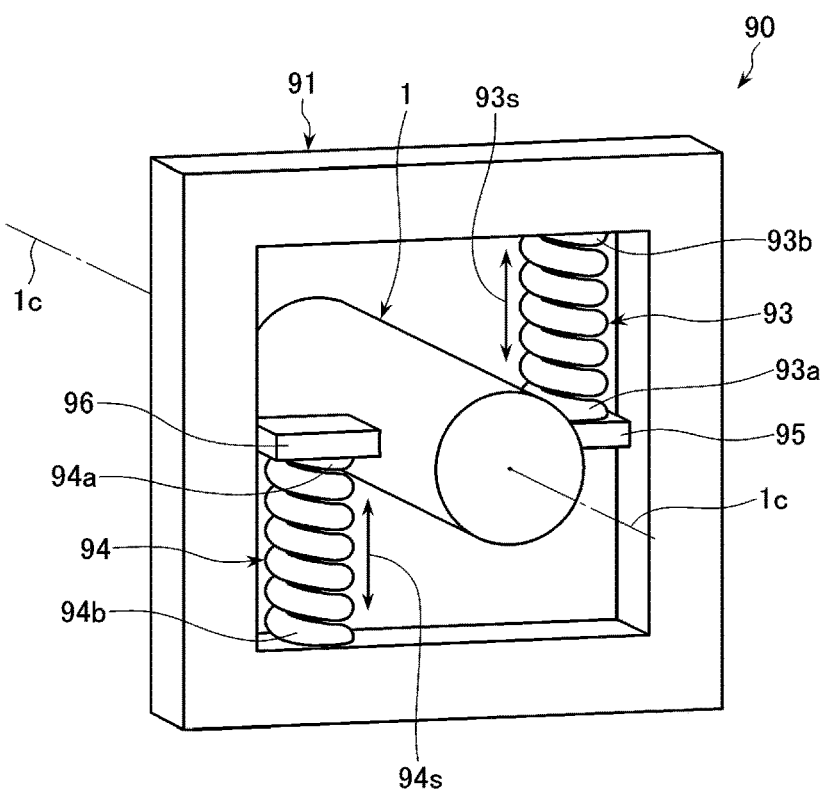
FIG. 24 is a partially omitted perspective view illustrating a forward/reverse micromotion rotational elastic bearing according to another embodiment.
Figure 25:
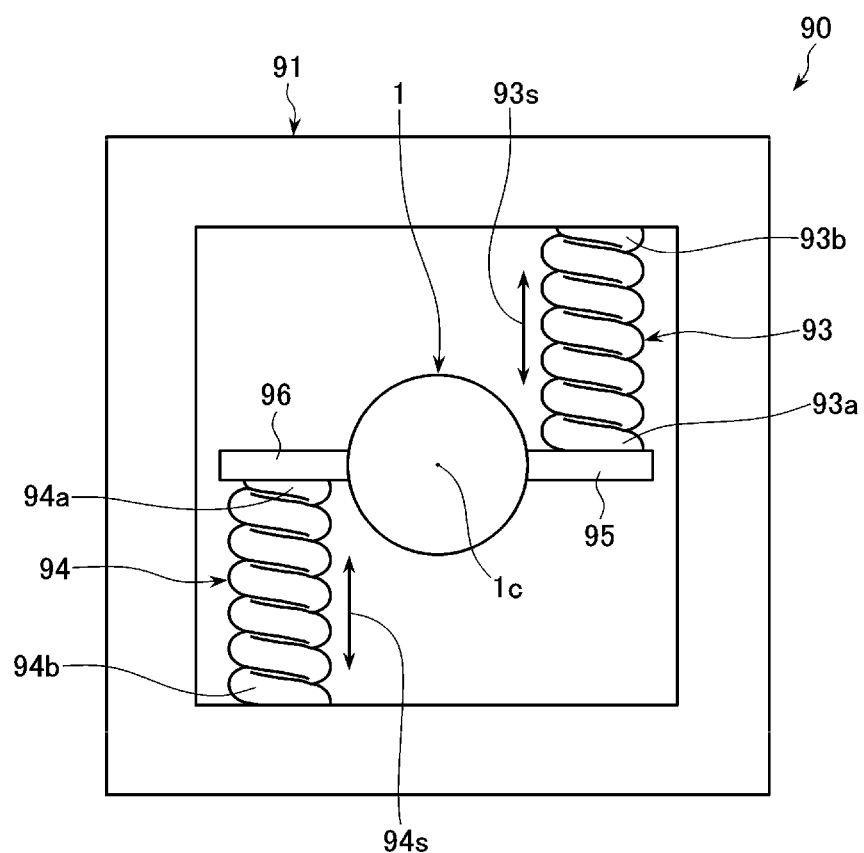
FIG. 25 is a partially omitted front view of the micromotion rotational elastic bearing illustrated in FIG. 24.

Next, in the forward/reverse micromotion rotational elastic bearing 90 illustrated in FIGS. 24 and 25, two coil springs 93, 94 and a shaft body 1 are disposed inside a polygonal (quadrangular) ring-shaped support member 91. The coil springs 93, 94 have the same shape and the same dimension, the side of proximal end portions 93b, 94b of the coil springs 93, 94 is locked at the inner circumferential surface of the support member 91, and the side of distal end portions 93a, 94a of the coil springs 93, 94 is locked at the outer circumferential surface of the shaft body 1 via flat plate-shaped coupling members 95, 96, respectively.

The coil springs 93, 94 are disposed such that stretching directions (longitudinal directions) 93s, 94s thereof are parallel with each other with the shaft body 1 interposed therebetween, and the coupling members 95, 96 are fixed to the outer circumferential surface of the shaft body 1 at positions with an interval of 180 degrees therebetween. The coupling members 95, 96 are fixed to project in the radial direction of the shaft body 1 from a shaft center 1c of the shaft body 1, and the stretching directions (longitudinal directions) 93s, 94s of the coil springs 93, 94 are orthogonal to the plane direction of the coupling members 95, 96.

The forward/reverse micromotion rotational elastic bearing 90 can be used similarly to the forward/reverse micromotion rotational elastic bearing 50 illustrated in FIG. 12, and similar effects and advantages can be obtained. Also, the coil springs 93, 94 configuring the forward/reverse micromotion rotational elastic bearing 90 are general-purpose parts with a simple shape that can be easily obtained, and the forward/reverse micromotion rotational elastic bearing 90 can thus achieve simplification of the structure and reduction of manufacturing cost.

INDUSTRIAL APPLICABILITY

The repeated moment generation device according to the present invention can be widely used in a fatigue testing machine adapted to load a repeated load on a test piece to test a fatigue strength property of a material.

REFERENCE SINGS LIST

1 Principal shaft
2a, 2b Principal bearing member
3a, 3b Lever member
4, 5, 10, 11 Shaft body
1c, 4c, 5c Shaft center
6, 7 Principal eccentric weight rotor
6a, 7a, 12a, 13a Centrifugal force
6h Female screw hole
7b Diameter expanded portion
7c Weight member
7d Locking nut
7e Bolt member
7f Stopper portion
7g Weight 8a, 8b, 9a, 9b Auxiliary bearing member
12, 13 Auxiliary eccentric weight rotor
14 Motor
14a Rotation shaft
15, 16 Middle timing pulley
17, 18 Large timing pulley
19a, 19b, 20a, 20b Small timing pulley
21, 22, 23 Timing belt
24 Table
24a Upper surface
24b Lower surface
24c Corner portion
25 Support member
25a Upper surface
25b Bottom plate
26 Bottom table
100 Repeated moment generation device
Fh Horizontal force component
Fv Vertical force component
Ls, Lm Distance
R Virtual rectangle

The invention claimed is:

1. A repeated moment generation device comprising: a principal shaft that is for transmitting a repeated torsional moment; two principal bearing members that rotatably hold the principal shaft; two lever members that are attached to the principal shaft at positions separated in a shaft center direction of the principal shaft in a state in which each of the lever members perpendicularly intersects a shaft center of the principal shaft; principal eccentric weight rotors that are provided at shaft bodies that are rotatably and axially supported by the lever members in a state in which each of the principal eccentric weight rotors is parallel to the principal shaft, at symmetrical positions with the principal shaft interposed therebetween in a region where the lever members face each other;
auxiliary eccentric weight rotors that are provided such that each of the auxiliary eccentric weight rotors is rotatable about a shaft body that is parallel to the principal shaft, between two pairs of auxiliary bearing members provided at members that are continued from the principal bearing members; and
drive means for causing the two principal eccentric weight rotors and the two auxiliary eccentric weight rotors to synchronously rotate,
wherein eccentricity directions of centers of gravity of the two principal eccentric weight rotors are different from each other by 180 degrees around shaft centers thereof,
eccentricity directions of centers of gravity of the two auxiliary eccentric weight rotors are different from each other by 180 degrees around shaft centers thereof, and
the eccentricity direction of the center of gravity of one of the principal eccentric weight rotors and the eccentricity direction of the center of gravity of the auxiliary eccentric weight rotor located on the same side as the principal eccentric weight rotor with respect to the principal shaft are different from each other by 180 degrees around the shaft centers thereof.

2. The repeated moment generation device according to claim 1, wherein two centrifugal forces generated through rotation of the two principal eccentric weight rotors have mutually the same magnitude and have acting directions that are opposite by 180 degrees, and two centrifugal forces generated through rotation of the two auxiliary eccentric weight rotors have mutually the same magnitude and have acting directions that are opposite by 180 degrees.

3. The repeated moment generation device according to claim 1, wherein a couple of forces defined by a product of two centrifugal forces generated through rotation of the two principal eccentric weight rotors and a distance between lines of action of the two centrifugal forces and a couple of forces defined by a product of two centrifugal forces generated through rotation of the two auxiliary eccentric weight rotors and a distance between lines of action of the two centrifugal forces have mutually the same magnitude and have opposite rotation directions.

4. The repeated moment generation device according to claim 1, wherein the two principal bearing members and the two pairs of auxiliary bearing members are provided at a table such that shaft centers of shaft bodies of the principal eccentric weight rotors and shaft centers of shaft bodies of the auxiliary eccentric weight rotors are parallel to each other.

* * * * *